US008491976B2

(12) United States Patent
Sato et al.

(10) Patent No.: US 8,491,976 B2
(45) Date of Patent: Jul. 23, 2013

(54) LAMINATE, PACKAGE, PACKAGING SHEET, PACKAGING MATERIAL, LABEL AND CONTAINER

(75) Inventors: Masahiro Sato, Osaka (JP); Naoki Higashi, Osaka (JP); Shuhei Kanno, Osaka (JP); Kiyoji Egashira, Osaka (JP); Hiroshi Kubo, Osaka (JP); Keiichi Kanno, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 0 days.

(21) Appl. No.: 13/265,306

(22) PCT Filed: Apr. 16, 2010

(86) PCT No.: PCT/JP2010/056874

§ 371 (c)(1), (2), (4) Date: Oct. 19, 2011

(87) PCT Pub. No.: WO2010/122964

PCT Pub. Date: Oct. 28, 2010

(65) Prior Publication Data

US 2012/0040113 A1 Feb. 16, 2012

(30) Foreign Application Priority Data

| | | |
|---|---|---|
| Apr. 20, 2009 | (JP) | 2009-101512 |
| Jun. 29, 2009 | (JP) | 2009-154391 |
| Jun. 29, 2009 | (JP) | 2009-154392 |
| Feb. 2, 2010 | (JP) | 2010-021679 |
| Feb. 18, 2010 | (JP) | 2010-033947 |

(51) Int. Cl.
*B29D 22/00* (2006.01)

(52) U.S. Cl.
USPC ............ 428/34.1; 428/195.1; 359/2; 359/884

(58) Field of Classification Search
USPC ........ 428/34.1, 195.1; 359/2, 884; 206/459.5; 235/491
See application file for complete search history.

(56) References Cited

U.S. PATENT DOCUMENTS

| | | | | |
|---|---|---|---|---|
| 4,756,917 | A * | 7/1988 | Kamada et al. | 428/457 |
| 4,848,931 | A * | 7/1989 | Kamada et al. | 383/104 |
| 5,118,930 | A | 6/1992 | Takada | |
| 6,793,138 | B2 * | 9/2004 | Saito | 235/470 |
| 6,824,849 | B2 * | 11/2004 | Herzog et al. | 428/40.1 |
| 2007/0119951 | A1 * | 5/2007 | Auslander et al. | 235/491 |
| 2009/0324142 | A1 * | 12/2009 | Nishikawa et al. | 383/105 |
| 2010/0123943 | A1 * | 5/2010 | Umemoto et al. | 359/2 |
| 2012/0040113 | A1 * | 2/2012 | Sato et al. | 428/34.1 |
| 2012/0118886 | A1 * | 5/2012 | Sekiguchi et al. | 220/200 |

FOREIGN PATENT DOCUMENTS

| | | | |
|---|---|---|---|
| JP | 2-212802 | A | 8/1990 |
| JP | 7-266725 | A | 10/1995 |
| JP | 8-254951 | A | 10/1996 |

(Continued)

*Primary Examiner* — N. Edwards

(74) *Attorney, Agent, or Firm* — Birch, Stewart, Kolasch & Birch, LLP

(57) ABSTRACT

A laminate and the like capable of improving the barcode reading accuracy with a configuration having a smaller number of layers is provided. Further, a laminate and the like capable of further improving the barcode reading accuracy and further reducing the size of a barcode portion even when applied to a conventional layer configuration is provided. The laminate includes a colored barcode print layer 5, a base material layer 1, and a bead-containing coating layer 7 having beads 7*b* dispersed in a resin 7*a*.

19 Claims, 5 Drawing Sheets

FOREIGN PATENT DOCUMENTS

| | | | |
|---|---|---|---|
| JP | 9-081971 | A | 3/1997 |
| JP | 2005-517561 | A | 6/2005 |
| JP | 2007-001130 | A | 1/2007 |
| JP | 2008-174302 | A | 7/2008 |
| JP | 2008-269545 | A | 11/2008 |

* cited by examiner

LAMINATE, PACKAGE, PACKAGING SHEET, PACKAGING MATERIAL, LABEL AND CONTAINER

TECHNICAL FIELD

The present invention relates to a laminate, a package, a packaging sheet, a packaging material, a label, and a container that ensure a high degree of barcode reading accuracy.

BACKGROUND ART

Conventionally, barcodes are printed on many articles and used for payment calculation and inventory adjustment at the checkout counters in supermarkets and convenience stores. A barcode is a meaningless and tasteless design for consumers, and causes the manufacturers to scarify the space for advertisement of the article. Therefore, a reduction in area for barcode printing is desired. On the other hand, for the purposes of management of expiration dates, prevention of accidental ingestion or misuse, and inventory control, it is required that barcodes are printed on pharmaceutical products such as capsules and tablets as well, on individual packages, in units of dosage, or in units of dispensing packages. In consideration of such demands, the present inventors previously developed a packaging sheet ensuring a high degree of barcode reading accuracy (Patent Document 1). The invention of the packaging sheet has proposed an improvement in barcode reading accuracy by interposing a white-colored layer between aluminum foil and a barcode portion, and a further improvement in barcode reading accuracy by interposing a transparent or semi-transparent undercoat layer between the aluminum foil and the white-colored layer.

PRIOR ART DOCUMENT

Patent Document

[Patent Document 1] Japanese Patent Application Laid-Open No. 2008-174302

DISCLOSURE OF THE INVENTION

Problems to be Solved by the Invention

The above-described conventional technique, however, is inadequate for the following reasons. Although the barcode reading accuracy may be improved, it is necessary to interpose the white-colored layer between the aluminum foil and the barcode portion. This restricts the tone of the packaging sheet to white, making it impossible to respond to the customers' requests for various colorings. Further, the material configuration becomes complicated, leading to an increase in cost. Even if it is tried to improve the barcode reading accuracy, if the same depends on the method for producing a packaging sheet or the like, it will not lead to an improvement in convenience for users. Furthermore, with the configuration of interposing a transparent or semi-transparent undercoat layer between the aluminum foil and the white-colored layer, the overall thickness of the packaging sheet will increase, and the time required for thermal adhesion will become long, possibly causing an adhesion failure.

In consideration of the problems of the conventional techniques, it is an object of the present invention to provide a layered structure, or, a laminate and the like which are able to improve the barcode reading accuracy with a configuration having a smaller number of layers. It is also an object of the present invention to provide a laminate and the like which are able to further improve the barcode reading accuracy and further reduce the size of a barcode portion even when applied to a conventional layer configuration. It is another object of the present invention to provide a laminate and the like which are able to assure a high degree of barcode reading accuracy for customers, while responding to various customers' requests, irrespective of the method for the production of a packaging sheet, for example. As used herein, the "reading accuracy" means to smoothly read the barcode information as electronic information by a barcode scanner (barcode reader and the like) without misreading or reading failure. It may also be called the "scanning accuracy".

Means for Solving the Problems

In view of the problems of the conventional techniques, the present inventors diligently conducted studies, and have found that the above problems can be solved by using a laminate and the like having specific configurations. The present invention provides the laminate and the like as follows.

The laminate includes a colored barcode print layer, a base material layer, and a bead-containing coating layer. This fundamental configuration is capable of improving barcode readability.

The barcode print layer is positioned on at least a part of the base material layer, the bead-containing coating layer is positioned to cover the barcode print layer, and the bead-containing coating layer includes at least one of resin beads, glass beads, metal oxide beads, and metal beads. This configuration is capable of improving barcode readability. Further, the bead-containing coating layer is able to protect the barcode print layer from inadvertent damage or the like.

The barcode print layer is positioned on at least a part of the base material layer, the bead-containing coating layer is positioned to cover the barcode print layer, and the bead-containing coating layer includes both of hard beads and soft beads formed of any of resin, glass, metal oxide, and metal. This configuration is capable of improving barcode readability and also improving one or both of heat resistance and pressure resistance of the laminate.

The hard beads are formed of glass beads, and the soft beads are formed of resin beads. With this configuration, in addition to the effects and advantages, discussed above, it is possible to improve one or both of the heat resistance and the pressure resistance of the laminate more reliably.

The bead-containing coating layer further includes metal oxide particles. With this configuration, in addition to the effects and advantages, discussed above, it is possible to further impart abrasion resistance to the laminate.

The metal oxide particles are formed of silica. With this configuration, in addition to the effects and advantages, discussed above, it is possible to impart the abrasion resistance to the laminate more reliably.

The hard beads have such a hardness that, when the laminate is used as a lid member sheet of a container and heat-sealed to a peripheral portion of an opening of the container, the hard beads are not deformed by a pressure applied at the time of heat sealing. With this configuration, in addition to the effects and advantages noted above, it is possible to improve one or both of the heat resistance and the pressure resistance of the laminate more reliably.

The hard beads have an average particle diameter greater than that of the soft beads. With this configuration, in addition to the effects and advantages discussed above, it is possible to improve one or both of the heat resistance and the pressure resistance of the laminate more reliably.

The bead-containing coating layer is positioned in contact with at least a part of the base material layer, the barcode print layer is positioned on and in contact with at least a part of the bead-containing coating layer, and the bead-containing coating layer includes at least one of resin beads, glass beads, metal oxide beads, and metal beads. This configuration is capable of improving the barcode readability, and also allows the barcode print layer to be laminated (printed) in a later process.

In the laminate for barcode printing, used for forming a barcode print layer thereon, the laminate is made up of a base material layer and a bead-containing coating layer, wherein the bead-containing coating layer includes at least one of resin beads, glass beads, metal oxide beads, and metal beads. With this configuration, it is possible to provide a laminate for barcode printing which ensures good barcode readability. A barcode may be printed afterwards on this laminate.

The bead-containing coating layer includes both of hard beads and soft beads formed of any of resin, glass, metal oxide, and metal. With this configuration, in addition to the effects and advantages discussed above, it is possible to further improve one or both of the heat resistance and the pressure resistance of the laminate.

The bead-containing coating layer further includes metal oxide particles. With this configuration, in addition to the effects and advantages noted above, it is possible to further impart abrasion resistance to the laminate.

The bead-containing coating layer includes resin beads and one of glass beads, metal oxide beads, and metal beads. With this configuration, it is possible to improve one or both of the heat resistance and the pressure resistance of the laminate.

The base material layer includes a metallic thin film layer. With this configuration, it is possible to impart, to the laminate, barrier properties (resistance to oxygen permeability, resistance to moisture permeability) by the metallic thin film layer and metallic luster (design effect) unique to the metallic thin film layer. It is also possible to increase the strength of the base material layer.

The base material layer includes a thermal adhesive layer. With this configuration, it is possible to impart heat sealing performance (thermal adhesive property) to the laminate.

The base material layer is transparent or semi-transparent, and the bead-containing coating layer is transparent or semi-transparent. This configuration is capable of improving the barcode readability. Further, the resultant laminate is transparent or semi-transparent in a region other than the barcode print portion, which may be suitably used for a label or the like.

The base material layer, the barcode print layer, and the bead-containing coating layer are laminated successively in this order. With this configuration, the bead-containing coating layer is able to protect the barcode print layer from inadvertent damage or the like.

The barcode print layer, the base material layer, and the bead-containing coating layer can be also laminated successively in this order. With this configuration, the barcode print layer may be laminated (printed) in a later process.

The resin beads, glass beads, metal oxide beads, and metal beads are transparent or semi-transparent. This configuration is capable of improving the barcode readability more reliably.

The resin beads, glass beads, metal oxide beads, and metal beads have an average particle diameter of 0.1 μm to 30 μm. This configuration is capable of improving the barcode readability more reliably, and is also favorable in terms of productivity.

A package can be provided which includes the laminate, and the laminate may be suitably used as a material constituting a part or a whole of a package.

A packaging sheet can be also provided which includes the laminate, and the laminate may be suitably used as a material constituting a part or a whole of the packaging sheet.

The packaging material made up of the laminate may be suitably used for a material constituting a part or a whole of a packaging material.

A label can be provided which includes the laminate. Thus, the laminates may be suitably used for a label.

A container can be provided with the label, the container being transparent or semi-transparent.

The above-described configurations commonly provide the following effects and advantages.

1. It is possible to improve the barcode reading accuracy, while the configuration (for example, thermal adhesive layer/aluminum foil/barcode print layer/bead-containing coating layer) has a smaller number of layers than that of the conventional technique.

2. It is possible to further improve the barcode reading accuracy and reduce the size of the barcode print portion even when applied to the conventional layer configuration (for example, thermal adhesive layer/aluminum foil/white-colored layer/barcode print layer/bead-containing coating layer).

3. While the white-colored layer was indispensable in the conventional configuration, it is optional in the present invention. Therefore, the laminate or the packaging material may be provided in a similar color configuration as before, as long as it does not impair the effects of the present invention (i.e., as long as a barcode can be read).

4. The bead-containing coating layer may be colored similarly as before, as long as it does not impair the effects of the present invention (i.e., as long as a barcode can be read).

5. It is possible to make the process steps simpler than in the conventional configuration, which leads to reduction in time of the process steps as well as cost-cutting.

6. With the improved barcode reading accuracy as compared with the conventional configuration, it is possible to reduce reading failure.

According to the present invention, it is possible to provide a laminate and a packaging material which are able to improve the barcode reading accuracy with the configurations having a smaller number of layers. When the present invention is applied to the conventional layer configuration, it is able to further improve the barcode reading accuracy, and further reduce the barcode portion in size and area as well.

Advantages of the Invention

According to the laminate of the present invention, it is possible to improve barcode reading accuracy with a configuration having a smaller number of layers. It is also possible to further improve the barcode reading accuracy and further reduce the size of the barcode portion even when applied to the conventional layer configuration.

MODES FOR CARRYING OUT THE INVENTION

<Base Material Layer>

A base material layer for use in the present invention may be a single body selected from among a sheet of paper, a sheet of synthetic paper, a resin film, a colored resin film, and a metallic thin film, or may be a composite body of at least two selected therefrom, and various colored layers or thermal adhesive layers, which will be described later, may be laminated thereon. A base material layer preferably includes a metallic thin film layer and/or a resin film. As the metallic thin film layer, aluminum foil, copper foil, gold foil, silver foil, aluminum-evaporated layer or the like may be used. Among them, aluminum foil is particularly preferable. Aluminum foil is not restricted to a particular type, but may be of any known type (including aluminum alloy foil; the same applies hereinbelow). For example, aluminum foil such as 1N30, 1070, 1100, 3003, 8021, or 8079, defined by JIS or the like, and having a thickness of 5 to 200 μm, more preferably 12 to 50 μm, may be used, and any of soft foil, hard foil, and half-hard foil may be used in accordance with the intended use or required properties. In the case of an aluminum-evaporated layer, one having a thickness of about 200 to about 1000 angstroms may be used.

The base material layer may include a colored layer, so as to be able to respond to various customers' requests, particularly to a designation of color. Herein, that "the base material layer includes a colored layer" means that a colored layer, for example a white-colored layer, is provided on the base material layer. At this time, although the base material layer is actually made up of 'base material layer body/colored layer', the base material layer body will be called the "base material layer", rather than the "base material layer body". Accordingly, it is defined, for example, that "a colored layer is provided on the base material layer".

The base material layer may include a thermal adhesive layer, so that it can readily be thermally bonded to a sheet which is, for example in the case of a laminate for a lid of a press-through package including pockets for pills, a flange portion adjacent to the pockets. At this time, although the base material layer is actually made up of 'thermal adhesive layer/base material layer body', the base material layer body will be called the "base material layer", rather than the "base material layer body". Accordingly, it is defined, for example, that "a thermal adhesive layer is provided on the back side of the base material layer".

Figure 1:
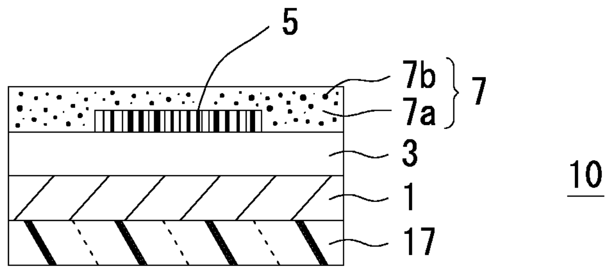
FIG. 1 shows a laminate according to an embodiment of the present invention (with a white-colored layer), in which a barcode print layer is covered with a bead-containing coating layer.
Figure 2:
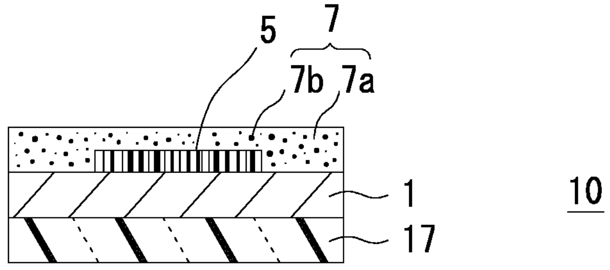
FIG. 2 shows a laminate according to an embodiment of the present invention (with no white-colored layer), in which a barcode print layer is covered with a bead-containing coating layer.

The base material layer of the present invention is not particularly restricted, as long as it allows a barcode to be read. For example, the base material layer may be one having a white-colored layer laminated on aluminum foil which is a base material layer, as in the conventional technique (see FIG. 1), one having a thermal adhesive layer laminated on aluminum foil (see FIG. 2), one having a transparent or semi-transparent undercoat layer interposed between a white-colored layer and aluminum foil, or one having a print layer other than the barcode or a solid colored layer laminated thereon. FIG. 1 shows a laminate 10 which includes a white-colored layer 3. Specifically, a base material layer (aluminum foil) 1 has a thermal adhesive layer 17 on its back side. The white-colored layer 3 is provided on the base material layer 1, and a barcode print portion 5 (also referred to as a "barcode print layer") is formed on the white-colored layer 3. A bead-containing coating layer 7 is provided to cover the barcode print portion 5. The bead-containing coating layer 7 includes a resin **7*a* and beads 7*b* dispersed within the resin. In FIG. 2, on a base material layer (aluminum foil) 1 having a thermal adhesive layer 17 arranged on its back side, a barcode print portion 5 is formed, and a bead-containing coating layer 7 including a resin 7*a* and beads 7*b* is arranged to cover the barcode print portion 5**. It is noted that the thermal adhesive layer may be replaced with any known adhesive, in accordance with the intended use, which may be a self-adhesive layer, a pressure-sensitive adhesive layer, a heat-sensitive adhesive layer, or the like.

In the case where a white colored layer 3 is to be laminated on aluminum foil 1 as the base material layer, the layer 3 is preferably about 1.0 g/m$^2$ to about 4.0 g/m$^2$ in terms of solid content weight per unit area. A white pigment for use in the white-colored layer 3 is preferably titanium dioxide, which is preferably contained in an amount of 20 wt % to 30 wt % within the white-colored layer 3. In the present invention, however, the pigment is not restricted thereto. Other pigments, such as phthalocyanine blue, phthalocyanine green, quinacridone series, quinophthalene series, perylene series, dioxazine series, isoindolinone series, iron oxide, mica, or color chip pigments thereof, may be used together, or may be laminated as a single solid colored layer, as long as it does not impair the effects of the present invention (i.e., as long as a barcode can be read). Further, it may be laminated on one or both sides of the aluminum foil. A resin component and solvent for use in a white-colored layer, a solid colored layer, or a print layer other than the barcode may be those known in the art. For example, the resin component may be modified olefin resin, petroleum-based hydrocarbon resin, nitrocellulose, butyral, or the like. The solvent may be any of aromatic hydrocarbons such as toluene, alicyclic hydrocarbons such as methylcyclohexane, esters such as ethyl acetate, ketones such as methyl ethyl ketone, alcohols such as isopropyl alcohol and denatured alcohol, or a combined solvent thereof.

The way of applying a print layer or a colored layer is not particularly restricted. They may be applied (laminated) by gravure roll coating, offset lithography, flexography, UV printing, curtain flow coating, or the like.

In the case where an undercoat layer is to be provided between the base material layer (aluminum foil) 1 and the white colored layer 3, a transparent or semi-transparent nitrocellulose, acrylic, epoxy, vinyl chloride, or polypropylene resin may be provided as the undercoat layer, in a thickness of about 0.3 μm to about 0.5 μm. When applying (laminating) the same, it is of course possible to use an appropriate solvent and a known method such as gravure roll coating.

In the case where a thermal adhesive layer 17 is to be provided on the base material layer 1, a known thermal adhesive layer 17 may be provided normally on a side of aluminum foil opposite from the side on which a barcode print layer is to be provided. For example, a thermal adhesive layer of vinyl chloride, polypropylene, polyolefin, polyester, ethylene-vinyl acetate copolymer, or the like may be provided in a known manner and in a thickness of about 1 μm to about 50 μm, or in an amount of about 1 $g/m^2$ to about 30 $g/m^2$ in terms of weight after drying.

<Barcode Print Layer>

A barcode print layer may be laminated on an arbitrary position of the laminate. By way of example, a prescribed barcode print layer 5 (also referred to as a "barcode print portion") may be provided on at least a part of the base material layer 1. The barcode print layer 5 may be provided by using a known printing ink and in a known manner. For example, a printing ink containing, as a colorant (pigment), phthalocyanine blue, phthalocyanine green, diketopyrrolopyrrole, quinacridone red, isoindolinone yellow, azomethine copper complex, perylene maroon, dioxazine violet, carbon black, iron oxide, indanthrene blue, quinophthalene series, perylene series, dioxazine series, isoindolinone series, or color chip pigments thereof may be used to print a barcode print layer by gravure printing, flexography, or the like. It is noted that the barcode is not restricted to the one printed in black by using carbon black, as long as it is readable. In the present invention, the barcode may be printed in red, green, blue, or any other visible color, besides black. Normally, a barcode print layer 5 is formed to have a thickness of 0.5 μm to 2.0 μm after drying, and the pigment may be contained in the ink layer in an amount of about 10 to about 40 wt % (preferably 15 to 40 wt %) in terms of solid content. A binder resin to be included in the printing ink may be vinyl acetate resin, vinyl chloride resin, vinyl acetate-vinyl chloride copolymer resin, polyurethane resin, nitrocellulose, or the like. The design and the size of the barcode print may be adjusted as appropriate in accordance with the customer's request. It may be for example a one-dimensional or two-dimensional barcode, or a matrix-type or composite-type QR code.

<Bead-Containing Coating Layer (Overprint Layer)>

In the present invention, a bead-containing coating layer (in this case, also referred to as an "overprint (OP) layer" or an "overcoat layer") 7 may be provided to cover a barcode print layer 5 by way of example (as used herein, "to cover" does not mean to cover both sides of the print layer 5, but means to overlay the bead-containing coating layer 7 on one side of the print layer 5 so as to prevent exposure thereof). The bead-containing coating layer 7 is configured to contain at least one type of beads (particles) **7*b* selected from among a group consisting of resin beads, glass beads, metal oxide beads, and metal beads. The beads 7*b*** are preferably composed of transparent or semi-transparent particles.

The bead-containing coating layer may further include at least one coloring pigment, so as to be able to respond to various requests from customers, particularly to a request of another effects in addition to the effects achieved by the colored layer explained above.

In the case of using resin beads, resin beads made up of any of the following may be suitably used: acrylic resin, urethane resin, melamine resin, amino resin, epoxy resin, polyethylene resin, polystyrene resin, polypropylene resin, polyester resin, cellulosic resin, vinyl chloride resin, polyvinyl alcohol, ethylene-vinyl acetate copolymer, ethylene-vinyl alcohol copolymer, ethylene-ethyl acrylate copolymer, polyacrylonitrile, polyamide, and the like. Among them, melamine resin is particularly preferable from the standpoint of overall barcode reading performance.

In the case of using glass beads, any known glass beads (commercially available) may be used.

In the case of using metal oxide beads, aluminum oxide beads may be used. In the present invention, a metal oxide refers to an oxide of a metal, semimetal (semiconductor), or the like other than non-metallic substances.

In the case of using metal beads, any known metal beads may be used.

For the matrix resin **7*a* constituting the bead-containing coating layer 7, nitrocellulose resin, acrylic resin, polyamide resin, urethane resin, or the like may be suitably used. The bead-containing coating layer 7 containing the beads 7*b* therein is deposited in an amount of preferably 0.3 $g/m^2$ to 10 $g/m^2$, and more preferably 1 $g/m^2$ to 5 $g/m^2$, in terms of weight after drying. The method for applying (laminating) the bead-containing coating layer is not particularly restricted. Any known applying or laminating method, such as gravure coating, roll coating, spraying, or extrusion laminating, may be used. For the beads 7*b***, those commercially available may be selected as appropriate for use.

The content of the beads **7*b* in the bead-containing coating layer 7** may be normally 1 to 40 wt %, and preferably 3 to 25 wt %, in terms of solid content. If the content of the beads is less than 1 wt %, the effect of refracting or scattering light will be little, resulting in a slightly inferior barcode reading accuracy. On the other hand, if it exceeds 40 wt %, dispersibility of the beads will deteriorate, and the clarity of the barcode itself will be impaired, again resulting in a slightly inferior barcode reading accuracy.

The beads **7*b* have an average particle diameter of preferably 0.1 to 30 μm, more preferably 0.5 to 20 μm, and particularly preferably 3 to 10 μm. If the average particle diameter of the beads 7*b* is less than 0.1 μm, their dispersibility within the matrix resin will deteriorate, or the clarity of the print surface may be somewhat impaired. On the other hand, if it exceeds 30 μm, the part sticking out from the matrix of the bead-containing coating layer 7** will increase, leading to a higher possibility that the beads will drop off therefrom, which event is desired to be avoided. It is noted that the average particle diameter is obtained through observation using a microscope (by scanning electron microscopy (SEM) or the like). In the case of spherical beads, the diameter of each bead is measured. In the case of non-spherical beads, the longest diameter (the longest distance when a bead is sandwiched between two parallel lines in the field of observation or on the photograph thereof) and the shortest diameter (the shortest distance when the bead is sandwiched between two parallel lines in the field of observation or on the photograph thereof) are measured, and the arithmetic average value thereof is obtained as the average diameter of the bead. The diameters or the average diameters of about 20 beads may be averaged so as to use the obtained value as the average particle diameter. An average particle diameter of metal oxide particles may be obtained in a similar manner. It is noted that a known pigment or colorant may be added into the bead-containing coating layer, as long as it does not impair the effects of the present invention, so that design effect or distinguishability may be imparted thereto.

<Bead-Containing Coating Layer Including Both of Hard Beads and Soft Beads>

The bead-containing coating layer may include both of hard beads and soft beads, which are formed of any of resin, glass, metal oxide, and metal. In this case, the materials of the hard and soft beads are not particularly restricted, as long as they are formed of the materials selected from among resin, glass, metal oxide, and metal. The hard and soft beads may be formed of the same material. Preferable combinations are hard glass beads and soft resin beads, hard resin beads and soft resin beads, and metal oxide beads and resin beads. The hard beads and the soft beads are preferably blended, in terms of weight, in the ratio of 10:90 to 90:10 (parts by weight). In the present invention, the hard beads refer to those having such a hardness that, when the laminate of the present invention is used as a lid member sheet to be heat-sealed to a peripheral portion of an opening of a container, they will not be deformed (crushed) due to a pressure applied at the time of heat sealing. The soft beads refer to those having a hardness that is lower than that of the hard beads. The hard beads include those formed of glass, metal oxide, metal, and hard resin such as engineering plastic. The soft beads include those formed of general resin excluding engineering plastic. More specifically, the soft beads refer to those having such a hardness that they are deformed by the pressure applied at the time of heat sealing. The hard beads preferably have an average particle diameter that is greater than that of the soft beads. Setting the average particle diameter of the hard beads greater than that of the soft beads makes it possible to effectively prevent deformation of the soft beads at the time of heat sealing.

Figure 3:
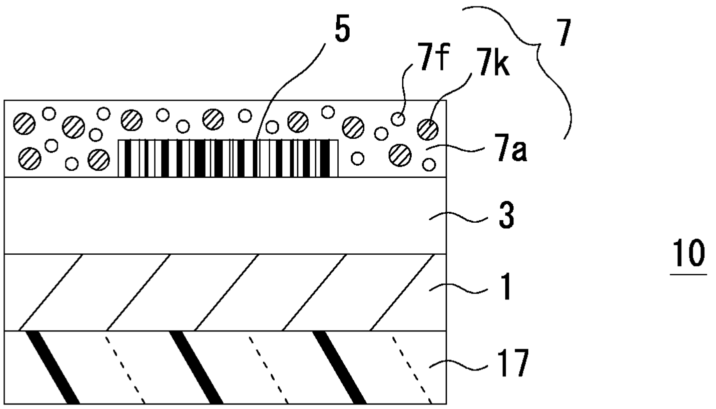
FIG. 3 shows the case where hard beads and soft beads are both contained in a bead-containing coating layer in a laminate according to an embodiment of the present invention (with a white-colored layer)
Figure 4:
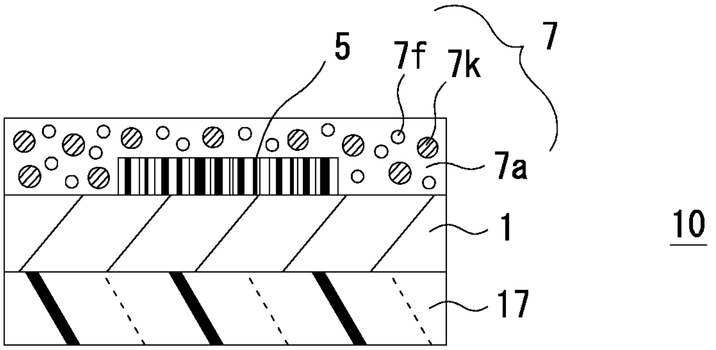
FIG. 4 shows the case where hard beads and soft beads are both contained in a bead-containing coating layer in a laminate according to an embodiment of the present invention (with no white-colored layer)

FIGS. 3 and 4 show laminates 10 in the case where the bead-containing coating layer 7 includes both of hard beads 7*k* and soft beads 7*f*. The laminate 10 in FIG. 3 includes a white-colored layer 3, while the laminate 10 in FIG. 4 includes no white-colored layer. In the case of using both of the hard and soft beads, the beads as a whole may be contained in an amount of 1 wt % to 40 wt % in terms of solid content, and the bead-containing coating layer may be deposited in an amount of 0.3 g/m$^2$ to 10 g/m$^2$, and preferably 1 to 5 g/m$^2$, in terms of weight after drying.

The hard beads may be inorganic beads other than those described above, while the soft beads may be organic beads other than those described above.

It is preferable that the hard beads are formed of glass, metal oxide, metal, or hard resin such as engineering plastic (polyamide-imide, polyether ether ketone, polyphenylene sulfide, polyacetal, polycarbonate, fluoroplastic), and that the soft beads are formed of general resin (resin other than engineering plastic). Including both of hard and soft beads provides the following effects and advantages. If only the soft beads, i.e. the resin beads formed for example of general resin, are included, the resin beads may be deformed (crushed) depending on the heat sealing condition, hindering the improvement of the barcode reading accuracy. When both of hard and soft beads are included as described above, deformation of the beads can substantially be prevented even if the heat sealing process is carried out at a high temperature and under a high pressure, thereby preventing the degradation in reading accuracy due to the deformation of the beads.

In the case of using both of the hard and soft beads, the hard beads may be glass beads, while the soft beads may be resin beads. In this case, the hard glass beads prevent deformation (crush) of the soft beads at the time of heat sealing. Further, when transparent or semi-transparent materials are used to form the hard and soft beads, the barcode reading accuracy may be improved. In addition to glass beads as the hard beads and resin beads as the soft beads, metal oxide particles may also be added into the bead-containing coating layer, to thereby improve the abrasion resistance of the bead-containing coating layer. For the metal oxide particles, at least one may be selected for use from among a group including silicon oxide (silica), titanium oxide, calcium oxide, talc (mixture of metal oxides), barium oxide, aluminum oxide, and the like. Among them, silicon oxide (silica) is particularly preferable from the standpoint of abrasion resistance. The metal oxide particles may be added into the bead-containing coating layer in an amount of preferably 3 to 15 wt %, and more preferably 5 to 10 wt % (in terms of solid content). The metal oxide particles may have an average particle diameter of preferably 0.1 to 5 μm. If the average particle diameter is too large, the abrasion resistance may not be improved sufficiently. If the average particle diameter is too small, uniform dispersion will be difficult, in which case as well, the abrasion resistance may not be improved sufficiently. In the case of adding the metal oxide particles, it is preferable that the relation of the average particle diameters (D) of the metal oxide particles and the respective beads satisfies the following expression, from the standpoint of abrasion resistance, pressure resistance, and durability.

Average particle diameter D of soft resin beads ≦ Average particle diameter D of metal oxide particles < Average particle diameter D of glass beads    Expression (1)

The hard beads may be configured to have such a hardness that, when the laminate is used as a lid member sheet for a container which is to be heat-sealed to a peripheral portion of an opening of the container, the hard beads are not deformed by a pressure applied at the time of heat sealing. This enables the hard beads to prevent the bead-containing coating layer from being crushed by the pressure applied at the time of heat sealing.

The hard beads may be configured to have an average particle diameter greater than that of the soft beads, so that the deformation of the soft beads is surely prevented.

<Laminate for Later Printing (Laminate for Barcode Printing)>

Figure 5:
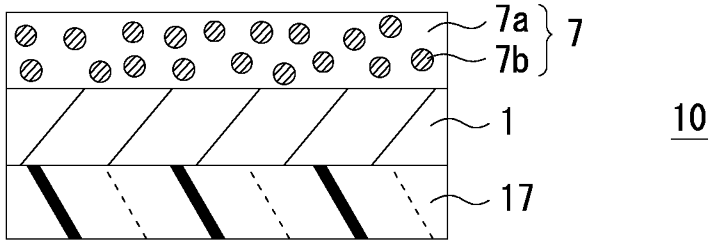
FIG. 5 shows a laminate according to an embodiment of the present invention, in the state before a barcode print layer is arranged by a customer.
Figure 6:
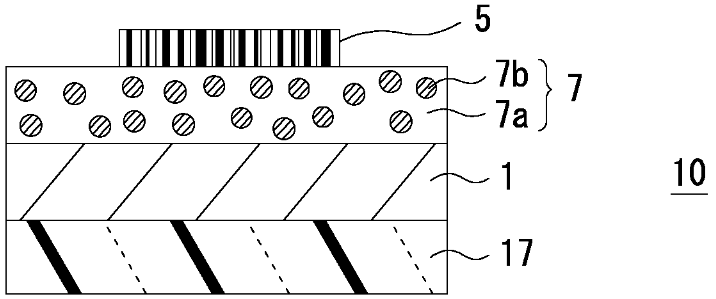
FIG. 6 shows the state where the barcode print layer has been arranged on the laminate in FIG. 5.

In the above embodiment, a barcode is printed on a base material layer, and a bead-containing coating layer is formed to cover the barcode print portion. However, some customers may wish to print a barcode later on site, for example before or after packing food stuff or the like, so as to include therein the information about the date of packing, lot number, place of origin, and others. In this case, it will be troublesome and difficult to form a bead-containing coating layer to cover the barcode print portion. The present invention is able to provide a laminate for later printing, which ensures a high degree of barcode reading accuracy even in such a case. Specifically, as shown in FIG. 5, a laminate 10 for barcode printing, not provided with a barcode print layer, is shipped. In this case, the laminate 10 has a thermal adhesive layer 17 on the back side of a base material layer 1, and a bead-containing coating layer 7 on the front side thereof. On the bead-containing coating layer 7 of the laminate shown in FIG. 5, a barcode print layer 5 may be formed by a customer, as shown in FIG. 6, in a printing method which will be described below. This configuration allows the customer to arrange, by themselves, a barcode including various kinds of specific information.

The configurations of the base material layer 1, the barcode 5, and the bead-containing coating layer 7 are identical to those in the above embodiment, and therefore, only the differences will be described here. The bead-containing coating layer 7 is laminated on at least a part of the base material layer 1, preferably on one side of the base material layer 1 (the side on which the barcode will be displayed). The bead-containing coating layer 7 may be laminated in any known manner; it may be applied by gravure roll coating, for example. In this manner, the laminate 10 for barcode printing is able to be provided. On this laminate 10 for barcode printing, on the bead-containing coating layer thereof, a prescribed barcode print portion 5 may be provided, as described above. The barcode may be printed for example by ink-jet printing, flexography, gravure printing, thermal recording, laser printing, or the like. The other details of the barcode print layer (portion) are similar to those in the above embodiment.

<Transparent Laminate>

While various laminates having barcode print portions and a laminate for barcode printing have been described above, a transparent base material layer may be used in some applications.

In the case where a label having a barcode printed thereon is to be attached onto a transparent or semi-transparent glass or plastic container, if the base material layer includes aluminum foil or a white-colored layer, the content may not be visually recognized through the base material layer, hindering confirmation of (1) presence/absence of foreign matter in the content, (2) deterioration or discoloration of the content, (3) proper amount of the content, and others. The present invention is able to provide a laminate which ensures a high degree of barcode reading accuracy and high visibility of the content at the same time.

The configurations of the bead-containing coating layer and the barcode print layer are similar to those in the above embodiment, and therefore, only the differences will primarily be described here.

The base material layer used here is not restricted in terms of its material, as long as it is transparent or semi-transparent. For example, a resin film, a glass film, an evaporated film, or the like may be used as appropriate.

For the resin film, one having a thickness of 5 μm to 500 μm is preferable. The material of the resin film may be selected from among various resins such as: low-density polyethylene, medium-density polyethylene, high-density polyethylene, linear low-density polyethylene, polypropylene, ethylene-propylene copolymer, ethylene-vinyl acetate copolymer, ionomer resin, ethylene-ethyl acrylate copolymer, ethylene-acrylate or methacrylate copolymer, methylpentene polymer, polybutene resin, polyvinyl chloride resin, polyvinyl acetate resin, polyvinylidene chloride resin, vinyl chloride-vinylidene chloride copolymer, poly(meth)acrylic resin, polyacrylonitrile resin, polystyrene resin, acrylonitrile-styrene copolymer (AS resin), acrylonitrile-butadiene-styrene copolymer (ABS resin), polyester resin, polyamide resin, polycarbonate resin, polyvinyl alcohol resin, saponified ethylene-vinyl acetate copolymer, fluorine resin, diene resin, polyacetal resin, polyurethane resin, nitrocellulose, and others. The resin film may be oriented monoaxially or biaxially. Further, the resin film may be subjected to surface smoothing processing, if required, by coating its surface with an anchor coating agent or the like.

For the evaporated film, an alumina-evaporated film or a silica-evaporated film, for example, may be used. It is preferable to use an evaporated film particularly in an application where barrier properties are required. The material of the film may be similar to that of the resin film described above.

The base material layer may be colored using a pigment or a colorant, as long as it is transparent or semi-transparent. The above-described anchor coating layer, primer coating layer, ultraviolet screening layer or the like may also be laminated thereon, within the range not impairing the effects of the present invention.

Figure 7:
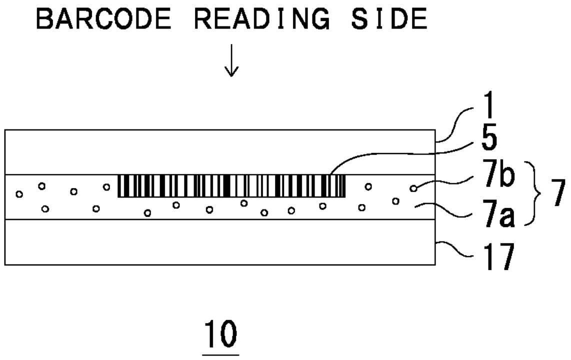
FIG. 7 shows a transparent laminate according to an embodiment of the present invention, having a structure of thermal adhesive layer/bead-containing coating layer/barcode print layer/base material layer.

The barcode print layer used here may be the one similar to that described in the above embodiment. In the case of the configuration as shown in FIG. 7, the barcode print layer 5 may be printed on the back side of a base material 1 by gravure printing or the like. The barcode print layer 5 is covered with a bead-containing coating layer 7 which is a resin layer 7*a* including beads 7*b*. On the bead-containing coating layer 7, a self-adhesive layer 17 or the like is laminated so as to be attached to an object.

Figure 8:
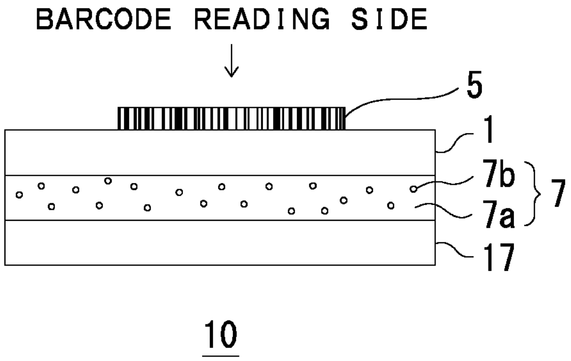
FIG. 8 shows a transparent laminate according to an embodiment of the present invention, having a structure of thermal adhesive layer/bead-containing coating layer/base material layer/barcode print layer.
Figure 9:
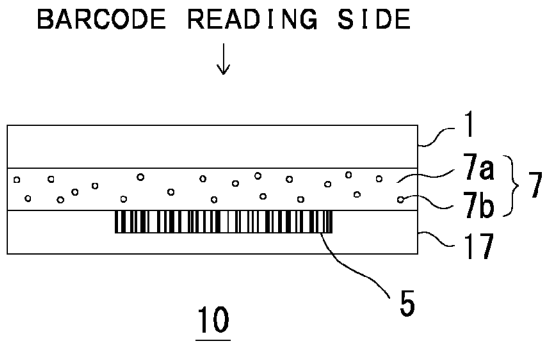
FIG. 9 shows a transparent laminate according to an embodiment of the present invention, having a structure of thermal adhesive layer/barcode print layer/bead-containing coating layer/base material layer.

In the case of the configuration as shown in FIG. 8, i.e. in the case where the barcode print layer 5 is to be located on the surface of a laminate 10, the barcode may be printed afterwards on a base material 1 or a bead-containing coating layer 7 by flexography or the like. In the case of FIG. 9, the back side of a base material 1 may be coated with a bead-containing coating layer 7, and then, the barcode 5 may be printed on the coated surface. It is noted that on the laminate 10 of the present invention, a print portion other than the barcode 5, for example the information about the name of product, code number, date of packing, manufacturer's name, and others, may be printed, as long as they do not impair the effects of the present invention.

For the bead-containing coating layer, the one similar to that described in the above embodiment may be used.

The laminate of the present invention composed of a colored barcode print layer, a transparent or semi-transparent base material layer, and a transparent or semi-transparent bead-containing coating layer may further be provided with a transparent or semi-transparent self-adhesive layer or an adhesive layer, such as a thermal adhesive layer, a pressure-sensitive adhesive layer, a heat-sensitive adhesive layer or the like, as required, for use as a packaging sheet, a tag, a label, or the like.

The self-adhesive layer is not particularly restricted, as long as it ensures transparency. Any known self-adhesive agent may be used as appropriate. For the self-adhesive agent, for example, acrylic resin, silicone resin, vinyl acetate resin, or rubber resin such as natural rubber, butyl rubber, polyisoprene, polyisobutylene, polychloroprene, or styrene-butadiene copolymer resin may be used as a primary component. The self-adhesive layer may be configured to include only such a component, or may be formed by mixing thereto the component of the transparent resin layer described above. The self-adhesive layer may be formed in a known coating method, by using the self-adhesive composition including the resin and the like.

The thermal adhesive layer is not particularly restricted, as long as it ensures transparency. For example, a thermal bonding agent or a thermal adhesive film having any of the following as a primary component may be laminated for use: low-density polyethylene, medium-density polyethylene, high-density polyethylene, straight-chain (linear) low-density polyethylene, polypropylene, ethylene-vinyl acetate copolymer, ionomer resin, ethylene-acrylate copolymer, ethylene-ethyl acrylate copolymer, ethylene-methacrylate copolymer, ethylene-methyl methacrylate copolymer, ethylene-propylene copolymer, methylpentene polymer, polybutene polymer, acid-modified polyolefin resin (i.e. a polyolefin resin, such as polyethylene or polypropylene, modified with an unsaturated carboxylic acid, such as acrylic acid, methacrylic acid, maleic acid, maleic anhydride, fumaric acid, or itaconic acid), polyvinyl acetate resin, poly(meth)acrylic resin, polyvinyl chloride resin, and the like. In the case of laminating a thermal adhesive film, it may be laminated in any known manner. For example, it may be laminated by dry lamination by using a polyurethane dry laminate adhesive. In the case of laminating a pressure-sensitive adhesive layer or a heat-sensitive adhesive layer, a known layer may be laminated in a known manner for use.

Referring to FIGS. 7 to 9, the positions for laminating the barcode print layer 5, the base material layer 1, and the bead-containing coating layer 7 in the laminate 10 may be selected as appropriate in accordance with the application, printing method, and required properties. For example, in the case of the laminate 10 in FIG. 7, the base material 1, the barcode print layer 5, and the bead-containing coating layer 7 covering the barcode print layer 5 may be arranged in this order from the outermost side (barcode reading side), and the self-adhesive layer etc. 17 may further be laminated depending on the intended use. In the case of FIG. 8, the barcode print layer 5, the base material layer 1, and the bead-containing coating layer 7 may be arranged successively, and the self-adhesive layer etc. 17 may further be laminated depending on the intended use. In the case of FIG. 9, the base material layer 1, the bead-containing coating layer 7, and the barcode print layer 5 may be arranged successively, and the self-adhesive layer etc. 17 may further be laminated depending on the intended use. As previously explained, the configuration in FIG. 8 is suitable in the case where a barcode is to be printed afterwards by flexography or ink-jet printing. In such a case, the layers other than the barcode print layer may firstly be laminated, and lastly, the barcode print layer may be laminated by printing as appropriate.

The laminate of the present invention is applicable to any known packaging material or package, such as lid members for press-through packages (PTP), individual packages for powdered medicine, granular medicine, or adhesive skin patches, packaging bags or boxes for food stuff or beverage, lid members for the containers of dairy products such as pudding or yogurt, and packaging bags or boxes for office supplies, machine parts, daily necessities, or kitchen equipment. Further, the laminate of the present invention may suitably be used for a label, a sealing tape, a tray, a price tag, a tag, a card, and so on.

In the case of using the laminate of the present invention as a lid member, it may be used as a lid member for a paper container, a metal container, a glass container, or a resin container formed of polypropylene, polyester, polystyrene, polyethylene or the like, and may be thermally bonded to a peripheral of an opening portion of the container, preferably to a flange of a container having the flange, by heat seal. Generally, heat seal may be performed at about 120° C. to about 260° C., under a pressure of 2 to 250 kg/cm$^2$, and for about one to three seconds. In the case of a press-through package, a hot plate provided with a lattice of convex strips, called a mesh seal, may be used for heat seal, so as to provide strong adhesive force and excellent sealing performance.

Figure 10:
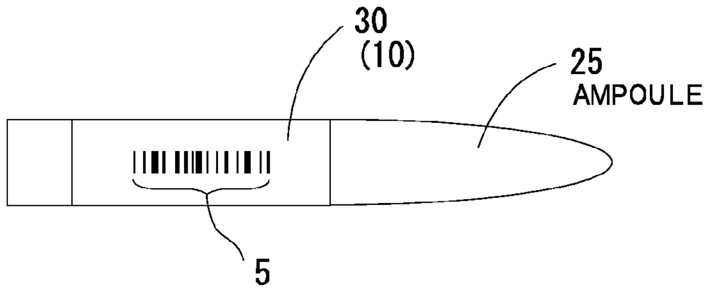
FIG. 10 shows an example where a label including a transparent laminate of the present invention has been attached onto an ampoule.

Further, the laminate of the present invention composed of a colored barcode print layer, a transparent or semi-transparent base material layer, and a transparent or semi-transparent bead-containing coating layer may be used for example as a packaging sheet, although the application is not restricted thereto. A thermal adhesive layer or the like may further be laminated on the laminate, as required, so that the laminate may be used as a lid member for a container, a packaging bag, a packaging box, a packaging container, or the like. Still alternatively, a self-adhesive layer or the like may be laminated on the laminate, as required, so that the laminate may be used for a label, a tag, a sealing label, a shrink label, or the like. While a container for attaching the label or the like thereto is not particularly restricted, it may be a resin container, a glass container, a paper container, a metal container, or any kind of bag. Particularly, the label or the like is suitable for a transparent or semi-transparent resin container, glass container, or resin bag. More specifically, the laminate is more suitably used as a label for a transparent or semi-transparent ampoule, vial, or other drug solution container, resin bag containing nutrient supplement, resin bag for drip infusion, or other drug solution bag. FIG. 10 shows an example where a label 30 which includes a laminate 10 having a barcode 5 thereon has been placed on an ampoule 25.

Each container or bag may be colored or colorless, as long as it is transparent or semi-transparent. Furthermore, it has been confirmed, through examples, that the effects of the present invention are achieved irrespective of whether the content of the container or bag, particularly drug solution or nutrient supplement, is colored or colorless.

EXAMPLES

The functions and effects of inventive examples according to the present invention were verified through various Examples. Hereinafter, the results of the verification will be described.

Example 1

Effects of Resin Beads within Overcoat Layer, in the Presence of White-Colored Layer In each of the inventive examples, on a glossy surface of aluminum foil (thickness: 17 μm; material: 8079 hard material), a white-colored layer was formed, and on the white-colored layer (matrix resin: polypropylene; contains 21 wt % titanium oxide pigment in terms of solid content; thickness after drying: 1.5 μm), a barcode portion (matrix resin: nitrocellulose; contains 16 wt % carbon black pigment in terms of solid content; thickness after drying: about 1.5 μm) of a barcode size (nominal 0.254 mm/module (line width: 0.2 mm minimum to 1.25 mm maximum; space: 0.3 mm minimum to 0.8 mm maximum)) was provided by gravure printing by using a gravure printing plate subjected to frame processing. Further, overcoat varnish containing resin beads listed in Table 1 (materials (which are all resins) and average particle diameters ("Particle Diameter") are listed in Table 1) (all of which are approximately spherical particles having transparency) was used to provide an overcoat layer (matrix resin: nitrocellulose; bead content: 11 wt % in terms of solid content; amount of coating: about 1.8 g/m$^2$ in terms of weight after drying) by using a gravure printing plate, so as to cover the barcode portion.

For these specimens, barcode readability was evaluated by using a barcode verifier, which will be described later. The specific layer configurations of the laminates of the specimens are as follows.

Inventive Examples A to F

Bead-Containing Overcoat Layer/Barcode Portion/White-Colored Layer/Aluminum Foil In the respective examples A to F, beads made up of different resins were used.

In a comparative example G, a laminate was produced which had a layer configuration similar to those of the inventive examples, except that it contained no beads.

Comparative Example G

Overcoat Layer/Barcode Portion/White-Colored Layer/Aluminum Foil

As the barcode verifier (barcode readability evaluating device) for evaluating the barcode readability of a barcode, TruCheck 401-RL manufactured by MUNAZO Co., Ltd. was used (where scanning was performed ten times). For Inventive Examples A to F and Comparative Example G, the aforementioned evaluating device was used to measure the following evaluation items: SC value (symbol contrast (Rmax−Rmin), unit: %), EDGE (edge determination), RL/Rd (maximum reflectance/minimum reflectance), MinEC (minimum edge contrast, unit: %), MOD (modulation, unit: %), Def (defects, unit: %), DCD (decode), DEC (decodability, unit: %), and MinQZ (minimum quiet zone). The results of the evaluation of these items as well as the overall evaluation are shown in Table 1. Further, the score ranges of the classes (levels) of the overall evaluation in Table 1 (in compliance with the American National Standards Institute (ANSI)) are shown in Table 2.

TABLE 1

| | Comparative Example G | | Inventive Example A | | Inventive Example B | | Inventive Example C | |
|---|---|---|---|---|---|---|---|---|
| Bead Material | NC | | Acryl | | Acryl | | Acryl | |
| Particle Diameter/μm | — | | 6.3 | | 4 | | 7 | |
| EDGE | 43 | A | 43 | A | 43 | A | 43 | A |
| RL/Rd | 71/1 | A | 91/5 | A | 94/7 | A | 75/4 | A |
| SC | 68 | B | 86 | A | 87 | A | 71 | A |
| MinEC | 59 | A | 70 | A | 71 | A | 59 | A |
| MOD | 85 | A | 81 | A | 82 | A | 83 | A |
| Def | 15 | A | 15 | A | 15 | A | 11 | A |
| DCD | 10/10 | A | 10/10 | A | 10/10 | A | 10/10 | A |
| DEC | 87 | A | 85 | A | 86 | A | 81 | A |
| MinQZ | N/A | A | N/A | A | N/A | A | N/A | A |
| Overall Evaluation | 2.9 | B | 3.5 | A | 3.7 | A | 3.8 | A |
| Amount of Deposition/ $gm^{-2}$ | 1.7 | | 1.8 | | 1.9 | | 1.9 | |

| | Inventive Example D | | Inventive Example E | | Inventive Example F | |
|---|---|---|---|---|---|---|
| Bead Material | Urethane | | Acryl | | Melamine | |
| Particle Diameter/μm | 4 | | 8 | | 5 | |
| EDGE | 43 | A | 43 | A | 43 | A |
| RL/Rd | 87/5 | A | 84/4 | A | 116/10 | A |
| SC | 82 | A | 80 | A | 107 | A |
| MinEC | 69 | A | 66 | A | 99 | A |
| MOD | 84 | A | 82 | A | 93 | A |
| Def | 15 | A | 15 | A | 11 | A |
| DCD | 10/10 | A | 10/10 | A | 10/10 | A |
| DEC | 86 | A | 86 | A | 85 | A |
| MinQZ | N/A | A | N/A | A | N/A | A |
| Overall Evaluation | 3.5 | A | 3.5 | A | 3.7 | A |
| Amount of Deposition/ $gm^{-2}$ | 1.9 | | 1.9 | | 1.9 | |

TABLE 2

| Grades According to Scores |
|---|
| 3.5 ≦ A (Excellent) ≦ 4.0 |
| 2.5 ≦ B (Very Good) < 3.5 |
| 1.5 ≦ C (Good) < 2.5 |
| 0.5 ≦ D (Fair) < 1.5 |
| F (Poor) < 0.5 |

According to Table 1, while Comparative Example G showed the SC value of 68 and the overall evaluation of "B", Inventive Examples A to F each showed the SC value of 71 to 107 and the overall evaluation of "A". The improvement in barcode readability according to the present invention is obvious.

Example 2

Effects of Metal Oxide Beads and Glass Beads within Overcoat Layer, in the Presence of White-Colored Layer Next, the effects according to the types of beads being contained in the overcoat layer were verified. Hereinbelow, the results of the verification will be described. In each of the inventive examples, on a glossy surface of aluminum foil (thickness: 17 μm; material: 8079 hard material), a white-colored layer was formed, and on the white-colored layer (matrix resin: polypropylene; contains 21 wt % titanium oxide pigment in terms of solid content; thickness after drying: 1.5 μm), a barcode portion (matrix resin: nitrocellulose; contains 16 wt % carbon black pigment in terms of solid content; thickness after drying: about 1.5 μm) of a barcode size (nominal 0.254 mm/module (line width: 0.2 mm minimum to 1.25 mm maximum; space: 0.3 mm minimum to 0.8 mm maximum)) was provided by gravure printing by using a gravure printing plate subjected to frame processing. Further, overcoat varnish containing either glass beads (transparent spherical particles, average particle diameter: about 6 μm) or aluminum oxide beads (semi-transparent particles of indefinite shape, average particle diameter: about 3 μm) was used to provide an overcoat layer (matrix resin: nitrocellulose; bead content: 15 wt % in terms of solid content; amount of coating: about 1.9 $g/m^2$ in terms of weight after drying) by using a gravure printing plate, so as to cover the barcode portion. In Inventive Examples H and I, the beads formed of different materials, i.e. aluminum oxide and glass, were used.

For these specimens, barcode readability was evaluated by using the aforementioned barcode verifier. The specific structures of the laminates of the specimens are as follows.

Inventive Examples H and I

Bead-Containing Overcoat Layer/Barcode Portion/White-Colored Layer/Aluminum Foil In a comparative example, a laminate was produced which had a layer configuration similar to those of the inventive examples, except that it contained no beads.

Comparative Example J

Overcoat Layer/Barcode Portion/White-Colored Layer/Aluminum Foil

As the barcode verifier for evaluating the readability of a barcode, the aforementioned evaluating device was used. Scanning was performed ten times. For Inventive Examples H and I and Comparative Example J, the above-described evaluation items were measured by the evaluating device. The results of the evaluation of these items and the overall evaluation are shown in Table 3.

According to Table 3, while Comparative Example J showed the SC value of 68 and the overall evaluation of "B", Inventive Examples H and I each showed the SC value of 71 to 82 and the overall evaluation of "A". The improvement in barcode readability according to the present invention is obvious. Further, there was no distinctive difference between Inventive Examples H and I. It is thus recognized that the contributions of the aluminum oxide beads and the glass beads to the improvement in barcode readability are approximately the same. Furthermore, in comparison with Table 1, it is recognized that the contributions of the resin beads, the aluminum oxide beads, and the glass beads, being contained in the overcoat layers in the present invention, to the improvement in barcode readability are approximately the same, within the range of the contents of evaluation described above.

TABLE 3

| | Comparative Example J | | Inventive Example H | | Inventive Example I | |
|---|---|---|---|---|---|---|
| Matrix Resin of OP Coat | Nitro-cellulose | | Nitro-cellulose | | Nitro-cellulose | |
| Bead Particle Diameter/μm | — | | about 3 | | about 6 | |
| Bead Content/wt % | 0 | | 15 | | 15 | |
| Bead Material | — | | Aluminum Oxide | | Glass | |
| EDGE | 43 | A | 43 | A | 43 | A |
| RL/Rd | 71/1 | A | 75/4 | A | 86/4 | A |
| SC | 68 | B | 71 | A | 82 | A |
| MinEC | 59 | A | 61 | A | 69 | A |
| MOD | 85 | A | 86 | A | 84 | A |
| Def | 15 | A | 12 | A | 15 | A |
| DCD | 10/10 | A | 10/10 | A | 10/10 | A |
| DEC | 87 | A | 86 | A | 86 | A |
| MinQZ | N/A | A | N/A | A | N/A | A |
| Overall Evaluation | 3.2 | B | 3.5 | A | 3.5 | A |
| Amount of Deposition/gm$^{-2}$ | 2.0 | | 1.8 | | 2.0 | |

Example 3

Effects of Resin Beads within Overcoat Layer, in the Absence of White-Colored Layer Hereinbelow, the results of examination in the case of providing no white-colored layer will be described. In the inventive example, on a glossy surface of aluminum foil (thickness: 17 μm; material: 8079 hard material), a barcode portion (matrix resin: nitrocellulose; contains 16 wt % carbon black pigment in terms of solid content; thickness after drying: about 1.5 μm) of a barcode size (nominal 0.254 mm/module (line width: 0.2 mm minimum to 1.25 mm maximum; space: 0.3 mm minimum to 0.8 mm maximum)) was provided by gravure printing by using a gravure printing plate subjected to frame processing. Further, overcoat varnish containing melamine resin beads (approximately spherical particles having transparency) having an average particle diameter of 5 μm was used to provide an overcoat layer (matrix resin: nitrocellulose; bead content: 15 wt % in terms of solid content; amount of coating: about 2.0 g/m$^2$ in terms of weight after drying) by using a gravure printing plate, so as to cover the barcode portion.

For the above specimen, barcode readability was evaluated by using the aforementioned barcode verifier. The specific structure of the laminate of the specimen is as follows.

Inventive Example K

Bead-Containing Overcoat Layer/Barcode Portion/Aluminum Foil

In a comparative example, a laminate was produced which had a layer configuration similar to that of the inventive example, except that it contained no beads.

Comparative Example L

Overcoat Layer/Barcode Portion/Aluminum Foil

The evaluation was made by using the aforementioned barcode verifier, where scanning was performed ten times. For Inventive Example K and Comparative Example L, the above-described evaluation items were measured by the evaluating device. The results of the evaluation of these items and the overall evaluation are shown in Table 4.

TABLE 4

| | Comparative Example L | | Inventive Example K | |
|---|---|---|---|---|
| Bead Material | — | | Melamine | |
| Bead Content/wt % | 0 | | 15 | |
| EDGE | 17 | F | 43 | A |
| RL/Rd | 91/1 | A | 116/12 | A |
| SC | 91 | A | 104 | A |
| MinEC | 44 | A | 94 | A |
| MOD | 48 | D | 90 | A |
| Def | 5 | A | 2 | A |
| DCD | 0/10 | F | 10/10 | A |
| DEC | 0 | F | 78 | A |
| MinQZ | 0 | F | N/A | A |
| Overall Evaluation | 0 | F | 3.8 | A |
| Amount of Deposition/gm$^{-2}$ | 2.0 | | 2.0 | |

According to Table 4, while Comparative Example L showed the DCD value of 0/10 and the overall evaluation of "F", meaning poor barcode readability, Inventive Example K showed the SC value of 104, the DCD value of 10/10, meaning good barcode readability, and the overall evaluation of "A". This shows that, in this evaluation test for the laminate having no white-colored layer as well, the barcode readability is considerably improved in the inventive example.

Example 4

Effects of Pigments within Bead-Containing Overcoat Layer, in the Absence of White-Colored Layer Hereinbelow, the results of examination in the case of providing no white-colored layer and adding a pigment to the overcoat layer will be described. In each of the inventive examples, on a glossy surface of aluminum foil (thickness: 17 μm; material: 8079 hard material), a barcode portion (matrix resin: nitrocellulose; contains 16 wt % carbon black pigment in terms of solid content; thickness after drying: about 1.5 μm) of a barcode size (nominal 0.254 mm/module (line width: 0.2 mm minimum to 1.25 mm maximum; space: 0.3 mm minimum to 0.8 mm maximum)) was provided by gravure printing by using a gravure printing plate subjected to frame processing. Further, overcoat varnish containing melamine resin beads (approximately spherical particles having transparency) having an average particle diameter of 5 μm and additionally containing a pigment ink (matrix resin: nitrocellulose, red pigment: soluble azo (monoazo series), blue pigment: phthalocyanine blue, yellow pigment: insoluble azo (disazo series)) was used to provide an overcoat layer (matrix resin: nitrocellulose; bead content: 12 wt % in terms of solid content; pigment content: 2 to 2.5 wt % in terms of solid content; amount of coating: about 2.0 g/$m^2$ in terms of weight after drying) by using a gravure printing plate, so as to cover the barcode portion.

For these specimens, barcode readability was evaluated by using the aforementioned barcode verifier. The specific structures of the laminates of the specimens are as follows.

Inventive Examples M to O

Overcoat Layer Containing (Coloring Pigment+Melamine Resin Beads)/Barcode Portion/Aluminum Foil In the respective examples M to O, different pigments of red, blue, and yellow were used.

In a comparative example, a laminate was produced which had a layer configuration similar to those of the inventive examples, except that it contained neither beads nor pigments.

Comparative Example P

Overcoat Layer/Barcode Portion/Aluminum Foil

The evaluation was made by using the aforementioned barcode verifier, where scanning was performed ten times. For Inventive Examples M to O and Comparative Example P, the above-described evaluation items were measured. The results of the evaluation of these items and the overall evaluation are shown in Table 5.

According to Table 5, while Comparative Example P showed the DCD value of 0/10 and the overall evaluation of "F", meaning poor barcode readability, Inventive Examples M to O each showed the SC value of 107 to 110, the DCD value of 9 to 10/10, meaning good barcode readability, and the overall evaluation of "A". This shows that, even if the pigments are added to the OP coat in an amount of about 2 to about 2.5 wt % in terms of weight after drying, excellent barcode readability is maintained with no problem.

TABLE 5

| | Comparative Example P | | Inventive Example M | | Inventive Example N | | Inventive Example O | |
|---|---|---|---|---|---|---|---|---|
| Bead Content/wt % | — | | 12 | | 12 | | 12 | |
| Added Ink | 0 | | Red | | Blue | | Yellow | |
| EDGE | 17 | F | 43 | A | 43 | A | 43 | A |
| RL/Rd | 91/1 | A | 117/7 | A | 117/10 | A | 117/7 | A |
| SC | 91 | A | 110 | A | 107 | A | 110 | A |
| MinEC | 44 | A | 103 | A | 94 | A | 97 | A |
| MOD | 48 | D | 94 | A | 88 | A | 89 | A |
| Def | 5 | A | 3 | A | 0 | A | 10 | A |
| DCD | 0/10 | F | 10/10 | A | 10/10 | A | 9/10 | A |
| DEC | 0 | F | 84 | A | 84 | A | 78 | A |
| MinQZ | 0 | F | N/A | A | N/A | A | N/A | A |
| Overall Evaluation | 0 | F | 4.0 | A | 4.0 | A | 4.0 | A |
| Amount of Deposition/ $gm^{-2}$ | 2.0 | | 1.8 | | 2.0 | | 1.8 | |

Example 5

In the Case of Printing Barcode on Undercoat Layer (Bead-Containing Coating Layer) in Laminate for Barcode Printing Next, the functions and effects of a laminate for barcode printing, i.e. a laminate for later printing which is prepared assuming that a barcode will be printed thereon by a customer after shipment, of each of the inventive examples were verified in this Example. Hereinbelow, the results of the verification will be described. In this case, the bead-containing coating layer is called an "undercoat layer", although the undercoat layer is in effect the same as the bead-containing coating layer described above.

Inventive Example 1

Thermal Adhesive Layer/Aluminum Foil/Undercoat Layer (with 5 μm-Diameter Melamine Beads)/Barcode Flexographically Printed with Carbon Pigment In Inventive Example 1, on a glossy surface of aluminum foil (thickness: 17 μm; material: 8079 hard material), an undercoat layer (amount of deposition after drying: 1.7 g/$m^2$) containing approximately transparent melamine resin beads (average particle diameter: 5 μm) in an amount of 15 wt % in terms of solid content in a matrix (primary component: nitrocellulose resin) was formed by gravure coating, and on a matte surface (opposite from the glossy surface) of the aluminum foil, a thermal adhesive layer having vinyl chloride-vinyl acetate-maleic acid copolymer as its primary component was applied as a coating, so as to be 4 g/$m^2$ in terms of weight after drying. In this manner, a laminate for barcode printing of Inventive Example 1 was produced.

Next, on the surface of the undercoat layer of the laminate for barcode printing, a barcode portion (matrix resin: nitrocellulose; contains 16 wt % carbon black pigment in terms of solid content; thickness after drying: about 1.5 μm) of a barcode size (nominal 0.254 mm/module (line width: 0.2 mm minimum to 1.25 mm maximum; space: 0.3 mm minimum to 0.8 mm maximum)) was printed afterwards by flexography.

Inventive Example 2

Thermal Adhesive Layer/Aluminum Foil/Undercoat Layer (with 2 μm-Diameter Melamine Beads+3.5 μm-Diameter Glass Beads)/Barcode Flexographically Printed with Carbon Pigment In Inventive Example 2, on a glossy surface of aluminum foil (thickness: 17 μm; material: 8079 hard material), an undercoat layer (amount of deposition after drying: 1.7 g/$m^2$) containing both of approximately transparent melamine resin beads (average particle diameter: 2 μm) in an amount of 15 wt % in terms of solid content and approximately transparent glass beads (average particle diameter: 3.5 μm) in an amount of 15 wt % in terms of solid content in a matrix (primary component: nitrocellulose resin) was formed by gravure coating. Thereafter, a laminate for barcode printing of Inventive Example 2 was produced similarly as in Inventive Example 1, and a barcode portion was printed afterwards on the surface of the undercoat layer of the laminate for barcode printing.

Comparative Example 1

Thermal Adhesive Layer/Aluminum Foil/White-Colored Layer/Clear Coat/Barcode Flexographically Printed with Carbon Pigment As Comparative Example 1, on a glossy surface of aluminum foil (thickness: 17 μm; material: 8079 hard material), a white-colored layer (matrix resin: polypropylene; contains 21 wt % titanium oxide pigment in terms of solid content; thickness after drying: 1.5 μm) was formed by gravure coating, and further, a clear coat (acrylic resin, thickness: about 1 μm) was applied on the white-colored layer. On a matte surface (opposite from the glossy surface) of the aluminum foil, a thermal adhesive layer having vinyl chloride-vinyl acetate-maleic acid copolymer as its primary component was applied as a coating, so as to be 4 g/m$^2$ in terms of weight after drying. In this manner, a laminate for barcode printing of Comparative Example 1 was produced.

Next, on the surface of the clear coat of the laminate for barcode printing, a barcode portion was printed afterwards, as in Inventive Example 1.

For these specimens, barcode readability was evaluated by using a barcode verifier, which will be described later. The layer configurations of the laminates of the specimens and the comparative example are summarized as follows.

Inventive Examples 1 and 2

Thermal Adhesive Layer/Aluminum Foil/Undercoat Layer Containing Beads/Barcode Portion Comparative Example 1

Thermal Adhesive Layer/Aluminum Foil/White-Colored Layer/Clear Coat/Barcode Portion As the barcode verifier (barcode readability evaluating device) for evaluating the readability of a barcode, TruCheck 401-RL manufactured by MUNAZO Co., Ltd. was used (where scanning was performed ten times). For Inventive Examples 1 and 2 and Comparative Example 1, the aforementioned evaluating device was used to measure the following evaluation items: SC value (symbol contrast (Rmax–Rmin), unit: %), EDGE (edge determination), Rl/Rd (maximum reflectance/minimum reflectance), MinEC (minimum edge contrast, unit: %), MOD (modulation, unit: %), Def (defects, unit: %), DCD (decode), DEC (decodability, unit: %), and MinQZ (minimum quiet zone). The results of the evaluation of these items as well as the overall evaluation are shown in Table 6. It is noted that the score ranges of the classes (levels) of the overall evaluation in Table 6 (in compliance with the American National Standards Institute (ANSI)) are as shown in Table 2 above.

TABLE 6

| | Inventive Example 1 | | Inventive Example 2 | | Comparative Example 1 | |
|---|---|---|---|---|---|---|
| EDGE | 43 | A | 43 | A | 43 | A |
| Rl/Rd | 117/8 | A | 122/10 | A | 67/1 | A |
| SC | 109 | A | 112 | A | 66 | B |
| MinEC | 89 | A | 103 | A | 48 | A |
| MOD | 82 | A | 92 | A | 72 | A |
| Def | 0 | A | 0 | A | 4 | B |
| DCD | 10/10 | A | 10/10 | A | 10/10 | A |
| DEC | 55 | B | 68 | A | 52 | A |
| MinQZ | N/A | A | N/A | A | N/A | A |
| Overall Evaluation | 3.0 | B | 4.0 | A | 2.7 | B |

According to Table 6, in Comparative Example 1 having a white-colored layer beneath the barcode but not containing beads, the SC value was 66 and the overall evaluation was 2.7 (evaluation class: B). In contrast, in Inventive Example 1 having no white-colored layer but containing beads in the undercoat, the SC value was improved to 109 and the overall evaluation was as high as 3.0 (evaluation class: B). Further, in Inventive Example 2 having both of the glass beads and the melamine beads in the undercoat, the SC value was improved to 112, and the overall evaluation obtained was 4.0 (evaluation class: A). When comparing Inventive Example 1 containing only the melamine beads with Inventive Example 2 containing both of the melamine beads and the glass beads, the one containing the melamine and glass beads showed better results. However, the diameters of the beads were not the same, so that more detailed analysis will be required. Nevertheless, it is evident that a high degree of barcode reading accuracy is able to be obtained with the melamine beads (Inventive Example 1) or the melamine and glass beads (Inventive Example 2), even if no white-colored layer is provided. Furthermore, a higher degree of reading accuracy is able to be obtained by including beads in the undercoat layer, as compared with the case of providing only the white-colored layer.

Next, the laminate having a barcode portion, produced in Inventive Example 2, was used as a lid member for a PTP container (polypropylene resin sheet having a large number of pockets formed for containing encapsulated drugs therein), and a flange surface which extends around the openings of the pockets and the thermal adhesive layer surface of the laminate were thermally bonded by applying a mesh seal under the conditions of 260° C.×0.25 MPa×300 shots (11.7 m/min) by using a heat sealer manufactured by CKD Corporation. For the barcode portion of the mesh-sealed PTP, the barcode readability was evaluated by using a barcode verifier, similarly as described above. The results are shown in Table 7.

TABLE 7

| | Inventive Example 2 | |
|---|---|---|
| EDGE | 43 | A |
| Rl/Rd | 122/8 | A |
| SC | 113 | A |
| MinEC | 100 | A |
| MOD | 88 | A |
| Def | 0 | A |
| DCD | 10/10 | A |
| DEC | 62 | A |
| MinQZ | N/A | A |
| Overall Evaluation | 4.0 | A |

According to Table 7, even after the high-temperature and high-pressure heat seal, the SC value was 113 and the overall evaluation was 4.0 (evaluation class: A), showing that good barcode readability according to the present invention is maintained. That is, when the undercoat layer contains glass beads and resin beads, the barcode reading accuracy of a highest level is able to be obtained even after the heat seal.

Example 6

In the Case where Bead-Containing Coating Layer Contains Both of Hard Beads and Soft Beads Next, the functions and effects in the case where both of hard beads and soft beads are contained in the bead-containing coating layers in the laminates of the inventive examples were verified. Hereinbelow, the results of the verification will be described.

Inventive Example 1

Thermal Adhesive Layer/Aluminum Foil/Barcode in Black Ink/Varnish (with Melamine Beads+Glass Beads)

In Inventive Example 1, on a glossy surface of aluminum foil (thickness: 20 μm; material: 8079 hard material), a barcode portion of a barcode size (nominal 0.254 mm/module (line width: 0.2 mm minimum to 1.25 mm maximum; space: 0.3 mm minimum to 0.8 mm maximum)) was provided by gravure printing using a gravure printing plate, by using a black ink (matrix resin: nitrocellulose; contains 16 wt % carbon black pigment in terms of solid content), so as to be about 1.5 μm in terms of thickness after drying. Next, overcoat varnish containing melamine beads (average particle diameter: 2 μm) in an amount of 15 wt % in terms of solid content weight and glass beads (average particle diameter: 3 μm) in an amount of 15 wt % in terms of solid content was used to provide an overcoat layer (matrix resin: nitrocellulose; amount of coating: 1.8 g/m$^2$ in terms of weight after drying) by using a gravure printing plate, so as to cover the barcode portion. The melamine beads and the glass beads were approximately spherical and almost transparent.

Next, on a matte surface (opposite from the surface on which the barcode portion was printed) of the aluminum foil, a thermal bonding agent having vinyl chloride-vinyl acetate-maleic acid copolymer resin as its primary component was applied by gravure coating so as to be 3.5 g/m$^2$ in terms of weight after drying, and the applied film was dried to thereby obtain a thermal adhesive layer.

In this manner, a packaging sheet (laminate) of Inventive Example 1 was produced.

Inventive Example 2

Thermal Adhesive Layer/Aluminum Foil/Barcode in Blue Ink/Varnish (with Melamine Beads+Glass Beads)

In Inventive Example 2, on a glossy surface of aluminum foil (thickness: 20 μm; material: 8079 hard material), a barcode portion of a barcode size (nominal 0.254 mm/module (line width: 0.2 mm minimum to 1.25 mm maximum; space: 0.3 mm minimum to 0.8 mm maximum)) was provided by gravure printing using a gravure printing plate, by using a blue ink (matrix resin: nitrocellulose; contains 27 wt % phthalocyanine blue pigment in terms of solid content), so as to be about 1.5 μm in terms of thickness after drying. Thereafter, a packaging sheet (laminate) was produced similarly as in Inventive Example 1.

Inventive Example 3

Thermal Adhesive Layer/Aluminum Foil/Barcode in Green Ink/Varnish (with Melamine Beads+Glass Beads)

In Inventive Example 3, on a glossy surface of aluminum foil (thickness: 20 μm; material: 8079 hard material), a barcode portion of a barcode size (nominal 0.254 mm/module (line width: 0.2 mm minimum to 1.25 mm maximum; space: 0.3 mm minimum to 0.8 mm maximum)) was provided by gravure printing using a gravure printing plate, by using a green ink (matrix resin: nitrocellulose; contains 31 wt % phthalocyanine green pigment in terms of solid content), so as to be about 1.5 μm in terms of thickness after drying. Thereafter, a packaging sheet (laminate) was produced similarly as in Inventive Example 1.

Inventive Example 4

Thermal Adhesive Layer/Aluminum Foil/Barcode in Black Ink/(Varnish+Yellow Pigment) (with Melamine Beads+Glass Beads)

A packaging sheet (laminate) was produced similarly as in Inventive Example 1, except that a yellow pigment (disazo series pigment) was further added in an amount of 3.3 wt % in terms of solid content weight to the overcoat varnish described in Inventive Example 1.

Inventive Example 5

Thermal Adhesive Layer/Aluminum Foil/Barcode in Blue Ink/(Varnish+Yellow Pigment) (with Melamine Beads+Glass Beads)

A packaging sheet (laminate) was produced similarly as in Inventive Example 2, except that a yellow pigment (disazo series pigment) was further added in an amount of 3.3 wt % in terms of solid content weight to the overcoat varnish in Inventive Example 2.

Inventive Example 6

Thermal Adhesive Layer/Aluminum Foil/Barcode in Green Ink/(Varnish+Yellow Pigment) (with Melamine Beads+Glass Beads)

A packaging sheet (laminate) was produced similarly as in Inventive Example 3, except that a yellow pigment (disazo series pigment) was further added in an amount of 3.3 wt % in terms of solid content weight to the overcoat varnish in Inventive Example 3.

Inventive Example 7

Thermal Adhesive Layer/Aluminum Foil/Barcode in Black Ink/Varnish (with Melamine Beads+Glass Beads)

A packaging sheet (laminate) was produced similarly as in Inventive Example 1, except that the amount of coating of the overcoat layer was made to be 2.7 g/m$^2$ in terms of weight after drying. It is noted that the amount of coating of the overcoat layer in Inventive Example 1 was 1.8 g/m$^2$ in terms of weight after drying. The overcoat layer in Inventive Example 7 was opaque white in appearance.

Comparative Example 1

Aluminum Foil/Barcode in Black Ink/Varnish

A packaging sheet (laminate) was produced similarly as in Inventive Example 1, except that overcoat varnish containing no beads was used as the overcoat varnish in Inventive Example 1.

Reference Example 2

Thermal Adhesive Layer/Aluminum Foil/Barcode in Black Ink/Varnish (with Melamine Beads)

A packaging sheet (laminate) was produced similarly as in Inventive Example 1, except that overcoat varnish containing only melamine beads (average particle diameter: 2 μm) in an amount of 15 wt % in terms of solid content weight was used as the overcoat varnish in Inventive Example 1.

For these specimens, barcode readability was evaluated by using a barcode verifier.

As the barcode verifier (barcode readability evaluating device) for evaluating the readability of a barcode, TruCheck 401-RL manufactured by MUNAZO Co., Ltd. was used (where scanning was performed ten times). For Inventive Examples 1 to 7, Comparative Example 1, and Reference Example 2, the aforementioned evaluating device was used to measure the following evaluation items: SC value (symbol contrast (Rmax−Rmin), unit: %), EDGE (edge determination), Rl (maximum reflectance), Rd (minimum reflectance), MinEC (minimum edge contrast, unit: %), MOD (modulation, unit: %), Def (defects, unit: %), DCD (decode), DEC (decodability, unit: %), and MinQZ (minimum quiet zone). The results of the evaluation of these items as well as the overall evaluation are shown in Table 8. It is noted that the score ranges of the classes (levels) of the overall evaluation in Table 8 (in compliance with the American National Standards Institute (ANSI)) are as shown in Table 2 above.

TABLE 8

| | Inventive Example 1 | | Inventive Example 2 | | Inventive Example 3 | | Inventive Example 4 | | Inventive Example 5 | |
|---|---|---|---|---|---|---|---|---|---|---|
| EDGE | 43 | A | 43 | A | 43 | A | 43 | A | 43 | A |
| Rl/Rd | 116/21 | A | 116/18 | A | 116/17 | A | 116/18 | A | 116/14 | A |
| SC | 95 | A | 99 | A | 99 | A | 98 | A | 102 | A |
| MinEC | 84 | A | 90 | A | 86 | A | 89 | A | 95 | A |
| MOD | 88 | A | 91 | A | 87 | A | 91 | A | 93 | A |
| Def | 4 | A | 0 | A | 2 | A | 2 | A | 0 | A |
| DCD | 10/10 | A | 10/10 | A | 10/10 | A | 10/10 | A | 10/10 | A |
| DEC | 83 | A | 86 | A | 77 | A | 75 | A | 85 | A |
| MinQZ | N/A | A | N/A | A | N/A | A | N/A | A | N/A | A |
| Overall Evaluation | 4.0 | A | 4.0 | A | 4.0 | A | 4.0 | A | 4.0 | A |

| | Inventive Example 6 | | Inventive Example 7 | | Comparative Example 1 | | Reference Example 2 | |
|---|---|---|---|---|---|---|---|---|
| EDGE | 43 | A | 43 | A | 17 | F | 43 | A |
| Rl/Rd | 116/21 | A | 117/8 | A | 91/1 | A | 116/10 | A |
| SC | 96 | A | 110 | A | 91 | A | 106 | A |
| MinEC | 86 | A | 104 | A | 44 | A | 90 | A |
| MOD | 90 | A | 95 | A | 48 | D | 85 | A |
| Def | 3 | A | 0 | A | 5 | A | 0 | A |
| DCD | 10/10 | A | 10/10 | A | 0/10 | F | 10/10 | A |
| DEC | 80 | A | 86 | A | 0 | F | 80 | A |
| MinQZ | N/A | A | N/A | A | 0 | F | N/A | A |
| Overall Evaluation | 4.0 | A | 4.0 | A | 0 | F | 3.9 | A |

According to Table 8, in Comparative Example 1 containing no beads, the SC value was 91 and the overall evaluation was “F”, with a poor reading accuracy. In Reference Example 2 which contains beads of melamine as a general resin and contains no hard beads, the overall evaluation at this stage (before heat seal) was 3.9 (evaluation class: A), which is almost as good as those of Inventive Examples 1 to 7.

The results of Inventive Examples 1 to 7 all fall within the evaluation class of “A”, meaning a considerable improvement in reading accuracy as compared with Comparative Example 1. Further, the results of Inventive Examples 1 to 7 indicate that they are independent of the following factors (e1) to (e3):

(e1) color of ink used for barcode printing;

(e2) presence/absence of yellow pigment in overcoat layer; and (e3) amount of deposition of overcoat layer, within a prescribed range.

In Inventive Examples 1 to 7, the SC value was 95 to 110 and the overall evaluation was “A”, irrespective of the above factors (e1) to (e3). The improvement in barcode readability according to the present invention is obvious.

Next, the effects on the readability of the barcode portion after heat seal were verified. Hereinbelow, the results of the verification will be described. It is noted that Comparative Example 1 was excluded here because, for Comparative Example 1 containing no beads, the reading accuracy was poor at the stage before heat seal, and thus, it was considered unnecessary to see the influence of the heat seal. The packaging sheets (laminates) of Inventive Examples 1 to 7 and Reference Example 2 were each used as a lid member for a PTP container (polypropylene resin sheet having a large number of pockets formed for containing encapsulated drugs therein), and a flange surface which extends around the openings of the pockets and the thermal adhesive layer surface of the packaging sheet were thermally bonded by applying a mesh seal under the conditions of 190° C.×0.3 MPa×1 second by using a heat sealer manufactured by CKD Corporation. For the barcode portion of the mesh-sealed PTP, the barcode readability was evaluated by using a barcode verifier, similarly as described above. The results are shown in Table 9.

TABLE 9

| | Inventive Example 1 | | Inventive Example 2 | | Inventive Example 3 | | Inventive Example 4 | |
|---|---|---|---|---|---|---|---|---|
| EDGE | 43 | A | 43 | A | 43 | A | 43 | A |
| Rl/Rd | 116/12 | A | 116/14 | A | 116/16 | A | 117/20 | A |

TABLE 9-continued

| | | | | | | | | |
|---|---|---|---|---|---|---|---|---|
| SC | 104 | A | 103 | A | 100 | A | 98 | A |
| MinEC | 92 | A | 95 | A | 87 | A | 80 | A |
| MOD | 89 | A | 93 | A | 87 | A | 82 | A |
| Def | 10 | A | 8 | A | 11 | A | 7 | A |
| DCD | 10/10 | A | 10/10 | A | 10/10 | A | 10/10 | A |
| DEC | 62 | A | 65 | B | 68 | A | 65 | A |
| MinQZ | N/A | A | N/A | A | N/A | A | N/A | A |
| Overall Evaluation | 3.8 | A | 3.6 | A | 3.7 | A | 3.5 | A |

| | Inventive Example 5 | | Inventive Example 6 | | Inventive Example 7 | | Reference Example 2 | |
|---|---|---|---|---|---|---|---|---|
| EDGE | 43 | A | 43 | A | 43 | A | 43 | A |
| Rl/Rd | 116/12 | A | 116/11 | A | 116/10 | A | 116/5 | A |
| SC | 104 | A | 105 | A | 107 | A | 111 | A |
| MinEC | 94 | A | 95 | A | 94 | A | 84 | A |
| MOD | 91 | A | 90 | A | 89 | A | 76 | A |
| Def | 7 | A | 7 | A | 1 | A | 45 | F |
| DCD | 10/10 | A | 10/10 | A | 10/10 | A | 5/10 | C |
| DEC | 71 | A | 75 | A | 63 | A | 64 | A |
| MinQZ | N/A | A | N/A | A | N/A | A | N/A | A |
| Overall Evaluation | 3.9 | A | 3.8 | A | 3.5 | A | 0 | F |

According to Table 9, in Reference Example 2 containing only the beads of melamine as a general resin, the Def value was 45 and the overall evaluation was 0 (evaluation class: F (poor)). In contrast, in Inventive Examples 1 to 7, the Def value was 11 or less and the overall evaluation was 3.5 to 3.9 (all falling with the evaluation class of "A"). The high degree of barcode reading accuracy according to the present invention is obvious even after the high-temperature and high-pressure heat seal. The influences of the above-described factors (e1) to (e3) were not observed after the heat seal, as well as before the heat seal. The beads within the overcoat layers in Inventive Examples 1 to 7 and in Reference Example 2 were observed under a microscope. While the beads in Reference Example 2 were deformed irregularly, deformation of the beads was hardly observed in the test samples of Inventive Examples 1 to 7.

Next, the effects of improving the abrasion resistance were verified by using an inventive example 8. Hereinbelow, the results of the verification will be described.

Inventive Example 8

Thermal Adhesive Layer/Aluminum Foil/Barcode in Black Ink/Varnish (with Melamine Beads+Glass Beads+Silica Particles)

In Inventive Example 8, on a glossy surface of aluminum foil (thickness: 20 μm; material: 8079 hard material), a barcode portion of a barcode size (nominal 0.254 mm/module (line width: 0.2 mm minimum to 1.25 mm maximum; space: 0.3 mm minimum to 0.8 mm maximum)) was provided by gravure printing using a gravure printing plate, by using a black ink (matrix resin: nitrocellulose; contains 16 wt % carbon black pigment in terms of solid content), so as to be about 1.5 μm in terms of thickness after drying. Next, overcoat varnish containing melamine beads (average particle diameter: 2 μm) in an amount of 15 wt % in terms of solid content weight and glass beads (average particle diameter: 6 μm) in an amount of 3 wt % in terms of solid content, and further containing silica particles (average particle diameter: 3 μm) as metal oxide particles in an amount of 5 wt % in terms of solid content weight was used to provide an overcoat layer (matrix resin: nitrocellulose; amount of coating: 1.8 g/m$^2$ in terms of weight after drying) by using a gravure printing plate, so as to cover the barcode portion. The melamine beads and the glass beads were approximately spherical and almost transparent.

Next, on a matte surface (opposite from the surface on which the barcode portion was printed) of the aluminum foil, a thermal bonding agent having vinyl chloride-vinyl acetate-maleic acid copolymer resin as its primary component was applied by gravure coating so as to be 3.5 g/m$^2$ in terms of weight after drying, and the applied film was dried to thereby obtain a thermal adhesive layer.

In this manner, a packaging sheet (laminate) of Inventive Example 8 was produced.

The packaging sheet (laminate) of Inventive Example 8 was used as a lid member for a PTP container (polypropylene resin sheet having a large number of pockets formed for containing encapsulated drugs therein), and a flange surface which extends around the openings of the pockets and the thermal adhesive layer surface of the packaging sheet were thermally bonded by applying a mesh seal under the conditions of 190° C.×0.3 MPa×1 second by using a heat sealer manufactured by CKD Corporation. For the barcode portion of the PTP before and after applying the mesh seal, the barcode readability was evaluated by using a barcode verifier, similarly as described above. The results are shown in Table 10.

TABLE 10

| | Inventive Example 8 Before Thermal Bonding | | Inventive Example 8 After Thermal Bonding | |
|---|---|---|---|---|
| EDGE | 43 | A | 43 | A |
| Rl/Rd | 118/11 | A | 118/13 | A |
| SC | 107 | A | 105 | A |
| MinEC | 99 | A | 92 | A |
| MOD | 92 | A | 87 | A |
| Def | 0 | A | 12 | A |
| DCD | 10/10 | A | 10/10 | A |
| DEC | 81 | A | 64 | A |
| MinQZ | N/A | A | N/A | A |
| Overall Evaluation | 4.0 | A | 3.5 | A |

Furthermore, the abrasion resistance was evaluated by using the packaging sheets (laminates) of Inventive Examples 8 and 1. Specifically, two pieces of the respective packaging sheets were prepared, and their overcoat surfaces were faced to each other. One piece of the packaging sheet was rubbed against the other back and forth 20 times with the fingers. For those of Inventive Example 8, the overcoat surfaces were hardly changed. For those of Inventive Example 1, fine scratches were made, leading to a reduced commercial value thereof. As a result, it has been found that, in the processes or applications requiring abrasion resistance, the metal oxide particles (particularly, silica) may be added into the overcoat layer so as to improve the abrasion resistance.

Example 7

Transparent Laminate

Next, the functions and effects in the case where the laminates of the inventive examples are transparent (while the barcode itself is colored) were verified. Hereinbelow, the results of the verification will be described. Seven specimens of Inventive Examples 1 to 5 and Comparative Examples 1 and 2 were used.

<Specimens>

Comparative Example 1

From the Barcode Reading Side: (25 μm-Thick PET/Barcode Print/Silica-Containing Coating Layer)

In Comparative Example 1, on a back side of a 25 μm-thick transparent polyethylene terephthalate film (PET), a barcode of a barcode size (nominal 0.200 mm/module (line width: 0.200 mm minimum to 0.800 mm maximum; space: 0.200 mm minimum to 0.800 mm maximum)) was provided by gravure printing using a gravure printing plate, by using a black ink (matrix resin: nitrocellulose; contains 16 wt % carbon black pigment in terms of solid content), so as to be about 1.5 μm in terms of thickness after drying. Further, to cover the barcode print portion, nitrocellulose having silica (silicon oxide) of an average particle diameter of about 1 μm dispersed therein in an amount of 5 wt % in terms of solid content was applied as a coating, so as to be 2 $g/m^2$ in terms of weight after drying. In this manner, a test sample of Comparative Example 1 was produced. The silica-containing coating layer was semi-transparent.

Comparative Example 2

From the Barcode Reading Side: (Silica-Containing Coating Layer/25 μm-Thick PET/Barcode Print In Comparative Example 2, on a front side (barcode reading side) of a 25 μm-thick polyethylene terephthalate film (PET), nitrocellulose having silica (silicon oxide) of an average particle diameter of about 1 μm dispersed therein in an amount of 5 wt % in terms of solid content was applied as a coating, so as to be 2 $g/m^2$ in terms of weight after drying. The silica-containing coating layer was semi-transparent. Next, on a back side of the PET, a barcode of a barcode size (nominal 0.200 mm/module) was provided by gravure printing using a gravure printing plate, by using a black ink (matrix resin: nitrocellulose; contains 16 wt % carbon black pigment in terms of solid content), so as to be about 1.5 μm in terms of thickness after drying. In this manner, a test sample of Comparative Example 2 was produced.

Inventive Example 1

From the Barcode Reading Side: (25 μm-Thick PET/Barcode Print/Bead-Containing Coating Layer)

In Inventive Example 1, on a back side of a 25 thick transparent polyethylene terephthalate film (PET), a barcode of a barcode size (nominal 0.200 mm/module) was provided by gravure printing using a gravure printing plate, by using a black ink (matrix resin: nitrocellulose; contains 16 wt % carbon black pigment in terms of solid content), so as to be about 1.5 μm in terms of thickness after drying. Further, to cover the barcode print portion, nitrocellulose having melamine beads of an average particle diameter of 5 μm dispersed therein in an amount of 15 wt % in terms of solid content was applied as a coating, so as to be 1 $g/m^2$ in terms of weight after drying. In this manner, a test sample of Inventive Example 1 was produced. The bead-containing coating layer was almost transparent.

Inventive Example 2

From the Barcode Reading Side: (25 μm-Thick PET/Barcode Print/Bead-Containing Coating Layer)

A test sample of Inventive Example 2 was produced similarly as in Inventive Example 1, except that the coating weight of the bead-containing coating layer was made to be 2 $g/m^2$ in terms of weight after drying.

Inventive Example 3

From the Barcode Reading Side: (Barcode Print/25 μM-Thick Pet/Bead-Containing Coating Layer)

In Inventive Example 3, on a front side (barcode reading side) of a 25 μm-thick transparent polyethylene terephthalate film (PET), a barcode of a barcode size (nominal 0.200 mm/module) was provided by gravure printing using a gravure printing plate, by using a black ink (matrix resin: nitrocellulose; contains 16 wt % carbon black pigment in terms of solid content), so as to be about 1.5 in terms of thickness after drying. Next, on a back side of the PET, nitrocellulose having melamine beads of an average particle diameter of 5 μm dispersed therein in an amount of 15 wt % in terms of solid content was applied as a coating, so as to be 1 $g/m^2$ in terms of weight after drying. In this manner, a test sample of Inventive Example 3 was produced. The bead-containing coating layer was almost transparent.

Inventive Example 4

From the Barcode Reading Side: (Barcode Print/25 μm-Thick PET/Bead-Containing Coating Layer)

A test sample of Inventive Example 4 was produced similarly as in Inventive Example 3, except that the coating weight of the bead-containing coating layer was made to be 2 $g/m^2$ in terms of weight after drying.

Inventive Example 5

From the Barcode Reading Side: (25 μm-Thick Pet/Bead-Containing Coating Layer/Barcode Print)

In Inventive Example 5, on a back side (opposite from the barcode reading side) of a 25 μm-thick transparent polyethylene terephthalate film (PET), nitrocellulose having melamine beads of an average particle diameter of 5 μm dispersed therein in an amount of 15 wt % in terms of solid content was applied as a coating, so as to be 2 $g/m^2$ in terms of weight after drying. After drying the coating, on the surface of the coating, a barcode of a barcode size (nominal 0.200 mm/module) was provided by gravure printing using a gravure printing plate, by using a black ink (matrix resin: nitrocellulose; contains 16 wt % carbon black pigment in terms of solid content), so as to be about 1.5 μm in terms of thickness after drying. In this manner, a test sample of Inventive Example 5 was produced. The bead-containing coating layer was almost transparent.

(Evaluation Test 1)

The above-described specimens were subjected to a barcode readability evaluation test by a barcode verifier.

As the barcode verifier (barcode readability evaluating device) for evaluating the readability of a barcode, TruCheck 401-RL manufactured by MUNAZO Co., Ltd. was used (where scanning was performed ten times). Test samples of Inventive Examples 1 to 5 and Comparative Examples 1 and 2 were each placed on a body of an empty ampoule (colorless and transparent glass injection vial; 14 mm in diameter×76 mm in length), with the barcode reading side facing outside (see FIG. 4). The aforementioned evaluating device was used to scan the barcode portions to measure the following evaluation items: SC value (symbol contrast (Rmax−Rmin), unit: %), EDGE (edge determination), Rl (maximum reflectance), Rd (minimum reflectance), MinEC (minimum edge contrast, unit: %), MOD (modulation, unit: %), Def (defects, unit: %), DCD (decode), DEC (decodability, unit: %), and MinQZ (minimum quiet zone). The results of the evaluation of these items as well as the overall evaluation are shown in Table 11. It is noted that the score ranges of the classes (levels) of the overall evaluation in Table 11 (in compliance with the American National Standards Institute (ANSI)) are as shown in Table 2 above.

TABLE 11

| | Comparative Example 1 | | Comparative Example 2 | | Inventive Example 1 | | Inventive Example 2 | |
|---|---|---|---|---|---|---|---|---|
| EDGE | 43 | A | 13 | F | 43 | A | 43 | A |
| Rl/Rd | 22/2 | A | 11/1 | A | 117/3 | A | 117/4 | A |
| SC | 20 | D | 10 | F | 113 | A | 113 | A |
| MinEC | 9 | F | 4 | F | 92 | A | 104 | A |
| MOD | 45 | D | 42 | D | 81 | A | 92 | A |
| Def | 0 | A | 0 | A | 14 | A | 8 | A |
| DCD | 3/10 | D | 0/10 | F | 10/10 | A | 10/10 | A |
| DEC | 47 | C | 0 | F | 76 | A | 75 | A |
| MinQZ | N/A | — | 6 | — | N/A | — | N/A | — |
| Overall Evaluation | 0.0 | F | 0.0 | F | 3.4 | B | 4.0 | A |

| | Inventive Example 3 | | Inventive Example 4 | | Inventive Example 5 | |
|---|---|---|---|---|---|---|
| EDGE | 43 | A | 43 | A | 43 | A |
| Rl/Rd | 117/6 | A | 117/6 | A | 122/5 | A |
| SC | 111 | A | 111 | A | 118 | A |
| MinEC | 104 | A | 104 | A | 97 | A |
| MOD | 93 | A | 94 | A | 82 | A |
| Def | 9 | A | 6 | A | 13 | A |
| DCD | 10/10 | A | 10/10 | A | 10/10 | A |
| DEC | 81 | A | 82 | A | 63 | A |
| MinQZ | N/A | — | N/A | — | N/A | — |
| Overall Evaluation | 3.2 | B | 3.8 | A | 3.1 | B |

According to Table 11, in Comparative Examples 1 and 2 both containing no beads, the SC value was 10 to 20 and the overall evaluation was "F", with a poor reading accuracy. In contrast, the results of Inventive Examples 1 to 5 showed the SC values of 111 to 118 and the evaluation classes of "A" to "B", indicating a considerable improvement in reading accuracy as compared with the Comparative Examples. The improvement in barcode readability according to the present invention is obvious. Moreover, the laminates were almost transparent except the barcode portions, allowing visual observations of the contents of the ampoules, thereby ensuring good visibility.

(Evaluation Test 2)

The specimens of Comparative Example 1 and Inventive Examples 2 and 4 were each placed on a body of an ampoule (similar to that used in Evaluation Test 1) filled with water, with the barcode reading side facing outside. The aforementioned evaluating device was used to scan the barcode portions to measure the SC value and other evaluation items. The results are shown in Table 12, where the effects of the present invention are obvious. The barcodes were able to be read with no problem even when the containers were filled with water. Further, it was readily possible to observe that there is no foreign matter in the water.

TABLE 12

| | Comparative Example 1 | | Inventive Example 2 | | Inventive Example 4 | |
|---|---|---|---|---|---|---|
| EDGE | 0 | F | 43 | A | 43 | A |
| Rl/Rd | 38/3 | A | 119/5 | A | 119/6 | A |
| SC | 35 | D | 115 | A | 113 | A |
| MinEC | 19 | A | 107 | A | 103 | A |
| MOD | 59 | C | 93 | A | 91 | A |
| Def | 13 | A | 0 | A | 2 | A |
| DCD | 0/10 | F | 10/10 | A | 10/10 | A |
| DEC | 0 | F | 77 | A | 80 | A |
| MinQZ | 0 | F | N/A | — | N/A | — |
| Overall Evaluation | 0.0 | F | 4.0 | A | 3.8 | A |

(Evaluation Test 3)

The evaluation items were measured similarly as in Evaluation Test 2, except that water in the ampoule was replaced with green tea (of light green). The specimens used were of Comparative Example 1 and Inventive Examples 2 and 4. The results are shown in Table 13, where the effects of the present invention are obvious. The barcodes were able to be read with no problem even if the containers were filled with green tea. Further, it was readily possible to observe tea leaves left in the tea.

TABLE 13

| | Comparative Example 1 | | Inventive Example 2 | | Inventive Example 4 | |
|---|---|---|---|---|---|---|
| EDGE | 0 | F | 43 | A | 43 | A |
| Rl/Rd | 40/1 | A | 119/3 | A | 119/4 | A |
| SC | 39 | D | 116 | A | 115 | A |
| MinEC | 21 | A | 105 | A | 103 | A |
| MOD | 53 | C | 90 | A | 90 | A |
| Def | 6 | A | 1 | A | 4 | A |
| DCD | 0/10 | F | 10/10 | A | 10/10 | A |
| DEC | 0 | F | 80 | A | 83 | A |
| MinQZ | 7 | F | N/A | — | N/A | — |
| Overall Evaluation | 0.0 | F | 4.0 | A | 4.0 | A |

(Evaluation Test 4)

The evaluation items were measured similarly as in Evaluation Test 2, except that water in the ampoule was replaced with commercially available liquid yogurt (of white). The specimens used were of Comparative Example 1 and Inventive Examples 2 and 4. The results are shown in Table 14, where the effects of the present invention are obvious. The barcodes were able to be read with no problem even if the containers were filled with yogurt.

TABLE 14

| | Comparative Example 1 | | Inventive Example 2 | | Inventive Example 4 | |
|---|---|---|---|---|---|---|
| EDGE | 43 | A | 43 | A | 43 | A |
| Rl/Rd | 35/3 | A | 119/7 | A | 119/11 | A |
| SC | 32 | D | 113 | A | 109 | A |
| MinEC | 26 | A | 106 | A | 99 | A |
| MOD | 82 | A | 94 | A | 91 | A |
| Def | 0 | A | 0 | A | 0 | A |
| DCD | 10/10 | A | 10/10 | A | 10/10 | A |
| DEC | 82 | A | 81 | A | 84 | A |
| MinQZ | N/A | — | N/A | — | N/A | — |
| Overall Evaluation | 1.0 | D | 4.0 | A | 4.0 | A |

(Evaluation Test 5)

The evaluation items were measured similarly as in Evaluation Test 2, except that water in the ampoule was replaced with commercially available cola (of almost black). The specimens used were of Comparative Example 1 and Inventive Examples 2 and 4. The results are shown in Table 15, where the effects of the present invention are obvious. The barcodes were able to be read with no problem even if the containers were filled with cola.

TABLE 15

| | Comparative Example 1 | | Inventive Example 2 | | Inventive Example 4 | |
|---|---|---|---|---|---|---|
| EDGE | 17 | F | 43 | A | 43 | A |
| Rl/Rd | 120/3 | A | 119/4 | A | 119/7 | A |
| SC | 117 | A | 115 | A | 113 | A |
| MinEC | 38 | A | 107 | A | 102 | A |
| MOD | 34 | F | 93 | A | 90 | A |
| Def | 24 | C | 0 | A | 7 | A |
| DCD | 0/10 | F | 10/10 | A | 10/10 | A |
| DEC | 0 | F | 77 | A | 84 | A |
| MinQZ | 0 | F | N/A | — | N/A | — |
| Overall Evaluation | 0.0 | F | 4.0 | A | 3.7 | A |

(Evaluation Test 6)

The evaluation items were measured similarly as in Evaluation Test 2, except that water in the ampoule was replaced with commercially available gargle (trade name: "Isodine") (of dark brown). The specimens used were of Comparative Example 1 and Inventive Examples 2 and 4. The results are shown in Table 16, where the effects of the present invention are obvious. The barcodes were able to be read with no problem even if the containers were filled with gargle.

TABLE 16

| | Comparative Example 1 | | Inventive Example 2 | | Inventive Example 4 | |
|---|---|---|---|---|---|---|
| EDGE | 43 | A | 43 | A | 43 | A |
| Rl/Rd | 17/1 | A | 119/3 | A | 129/5 | A |
| SC | 16 | F | 116 | A | 124 | A |
| MinEC | 10 | F | 103 | A | 107 | A |
| MOD | 62 | B | 89 | A | 87 | A |
| Def | 0 | A | 3 | A | 3 | A |
| DCD | 9/10 | A | 10/10 | A | 10/10 | A |
| DEC | 55 | B | 74 | A | 83 | A |
| MinQZ | N/A | — | N/A | — | N/A | — |
| Overall Evaluation | 0.0 | F | 4.0 | A | 3.9 | A |

(Evaluation Test 7)

The evaluation items were measured similarly as in Evaluation Test 1, except that the colorless and transparent glass ampoule was replaced with a brown glass ampoule. The specimens used were of Comparative Example 1 and Inventive Examples 2 and 4. The results are shown in Table 17, where the effects of the present invention are obvious. The barcodes were able to be read with no problem even in the case of the brown containers.

TABLE 17

| | Comparative Example 1 | | Inventive Example 2 | | Inventive Example 4 | |
|---|---|---|---|---|---|---|
| EDGE | 19 | F | 43 | A | 43 | A |
| Rl/Rd | 89/14 | A | 119/6 | A | 119/10 | A |
| SC | 75 | A | 114 | A | 109 | A |
| MinEC | 30 | A | 105 | A | 100 | A |
| MOD | 39 | F | 92 | A | 91 | A |
| Def | 17 | B | 2 | A | 2 | A |
| DCD | 0/10 | F | 10/10 | A | 10/10 | A |
| DEC | 0 | F | 78 | A | 79 | A |
| MinQZ | 0 | F | N/A | — | N/A | — |
| Overall Evaluation | 0.0 | F | 4.0 | A | 4.0 | A |

In any of the above-described evaluation tests, the barcode readability was poor in those other than the Inventive Examples, even if the object used was visible from the outside. This shows that only those of the present invention are able to assure good readability of the barcode and high visibility of the used object together.

While the embodiments and examples of the present invention have been described above, it should be understood that the embodiments and examples disclosed above are only illustrative and that the scope of the present invention is not restricted to those embodiments. The scope of the present invention is defined by the terms of the claims, and is intended to include any modifications within the scope and meaning equivalent to the terms of the claims.

INDUSTRIAL APPLICABILITY

The laminate and others of the present invention each enable a compact and high-density barcode to be read with accuracy by using a commercially available barcode reader, whereby their contributions to the quality control and others in this field are expected. They are particularly useful in preventing drug mix-ups, managing expiration dates, preventing counterfeiting, and others.

DESCRIPTION OF THE REFERENCE CHARACTERS

1: base material; 3: white-colored layer; 5: barcode print; 7: bead-containing coating layer (undercoat layer); 7*a*: resin; 7*b*: bead; 7*f*: soft bead; 7*k*: hard bead; 10: laminate; 17: thermal adhesive layer, self-adhesive agent, etc.; 25: ampoule; and 30: label.

The invention claimed is:

1. A laminate comprising a colored barcode print layer provided with a bead-containing coating layer, forming a composite layer, said composite layer being disposed on a base material layer, wherein the base material layer includes a metallic thin film layer.

2. The laminate according to claim 1, wherein the barcode print layer is positioned on at least a part of the base material layer, the bead-containing coating layer is positioned to cover the barcode print layer, and the bead-containing coating layer includes at least one member selected from the group consisting of resin beads, glass beads, metal oxide beads, and metal beads.

3. The laminate according to claim 1, wherein the barcode print layer is positioned on at least a part of the base material layer, the bead-containing coating layer is positioned to cover the barcode print layer, and the bead-containing coating layer includes both hard beads and soft beads formed of at least one member selected from the group consisting of a resin, a glass, a metal oxide, and a metal.

4. The laminate according to claim 3, wherein the hard beads are formed of glass beads, and the soft beads are formed of resin beads.

5. The laminate according to claim 4, wherein the bead-containing coating layer further includes metal oxide particles.

6. The laminate according to claim 5, wherein the metal oxide particles are foamed of silica.

7. The laminate according to claim 3, wherein the hard beads have an average particle diameter greater than that of the soft beads.

8. The laminate according to claim 1, wherein the bead-containing coating layer is positioned in contact with at least a part of the base material layer, the barcode print layer is positioned on and in contact with at least a part of the bead-containing coating layer, and the bead-containing coating layer includes at least one of resin beads, glass beads, metal oxide beads, and metal beads.

9. A laminate for barcode printing, used for forming a barcode print layer thereon, the laminate comprising a base material layer and a bead-containing coating layer disposed on the base material layer, the bead-containing coating layer including at least one member selected from the group consisting of resin beads, glass beads, metal oxide beads, and metal beads and the base material layer includes a metallic thin film layer.

10. The laminate according to claim 9, wherein the bead-containing coating layer includes both of hard beads and soft beads formed of at least one member selected from the group consisting of a resin, a glass, a metal oxide, and a metal.

11. The laminate according to claim 10, wherein the bead-containing coating layer further includes metal oxide particles.

12. The laminate according to claim 9, wherein the bead-containing coating layer includes resin beads and at least one member selected from the group consisting of glass beads, metal oxide beads, and metal beads.

13. The laminate according to claim 1, wherein the base material layer includes a thermal adhesive layer.

14. The laminate according to claim 2, wherein the resin beads, glass beads, metal oxide beads, and metal beads are transparent or semi-transparent.

15. The laminate according to claim 2, wherein the resin beads, glass beads, metal oxide beads, and metal beads have an average particle diameter of 0.1 μm to 30 μm.

16. A package comprising the laminate according to claim 1.

17. A packaging sheet comprising the laminate according to claim 1.

18. A packaging material comprising the laminate according to claim 1.

19. A laminate comprising a colored barcode print layer provided with a bead-containing coating layer, forming a composite layer, said composite layer being disposed on a base natural layer, said base material layer including a metallic thin film layer, wherein the barcode print layer is positioned on at least a part of the base material layer, the bead-containing coating layer is positioned to cover the barcode print layer, and the bead-containing coating layer includes both hard beads and soft beads formed of at least one member selected from the group consisting of a resin, a glass, a metal oxide, and a metal, and wherein the hard beads have such a hardness that, when the laminate is used as a lid member sheet of a container and heat-sealed to a peripheral portion of an opening of the container, the hard beads are not deformed by a pressure applied at the time of heat sealing.

* * * * *